United States Patent
Osder

[19]

[11] Patent Number: 5,951,608
[45] Date of Patent: Sep. 14, 1999

[54] FLIGHT CONTROL SYSTEM FOR JET POWERED TRI-MODE AIRCRAFT

[75] Inventor: Stephen S. Osder, Scottsdale, Ariz.

[73] Assignee: McDonnell Douglas Helicopter Company, Mesa, Ariz.

[21] Appl. No.: 08/873,504

[22] Filed: Jun. 12, 1997

Related U.S. Application Data

[62] Division of application No. 08/568,144, Dec. 6, 1995.

[51] Int. Cl.$^6$ .......................... B64C 27/24; B64C 11/34; B64C 27/57
[52] U.S. Cl. .................................. 701/11; 701/5; 701/7; 244/8; 244/11; 244/17.13
[58] Field of Search .................................. 701/4, 5, 6, 7, 701/8, 11; 244/17.13, 181, 182, 195, 8, 11

[56] References Cited

U.S. PATENT DOCUMENTS

| | | | |
|---|---|---|---|
| 3,603,697 | 9/1971 | Lane | 416/33 |
| 4,420,808 | 12/1983 | Diamond et al. | 244/177 |
| 4,675,827 | 6/1987 | Narita et al. | 364/478.01 |
| 4,807,129 | 2/1989 | Perks . | |
| 4,947,334 | 8/1990 | Massey et al. | 701/99 |
| 4,965,879 | 10/1990 | Fischer, Jr. | 701/3 |
| 4,967,363 | 10/1990 | Bonafe | 364/427 |
| 4,979,696 | 12/1990 | Lederman | 244/8 |
| 4,980,835 | 12/1990 | Lawrence et al. | 244/17.13 |
| 5,001,646 | 3/1991 | Caldwell et al. | 701/3 |
| 5,224,664 | 7/1993 | Adams, Sr. et al. | 244/17.13 |
| 5,265,826 | 11/1993 | Ebert et al. | 244/17.13 |
| 5,265,827 | 11/1993 | Gerhardt | 244/20 |
| 5,274,558 | 12/1993 | High et al. | 244/180 |
| 5,314,147 | 5/1994 | Ebert et al. | 244/182 |
| 5,331,559 | 7/1994 | High et al. | 364/431.02 |

*Primary Examiner*—V Lissi Mojica
*Attorney, Agent, or Firm*—Stout, Uxa, Buyan & Mullins, LLP; Donald E. Stout; Kenton R. Mullins

[57] ABSTRACT

The disclosed flight control system includes a rotor blade speed monitor for monitoring the rotor blade speed of the jet powered tri-mode aircraft and for outputting a rotor blade speed command. The flight control system also includes an aircraft attitude controller for controlling the aircraft attitude of the jet powered tri-mode aircraft. Weighted rotor blade attitude stabilization commands and weighted aero surface attitude stabilization commands are output from the aircraft attitude controller to distribute power, control, and lift between the rotor blade and the aero surfaces. Relative weights of the weighted rotor blade attitude stabilization commands decrease with increasing aircraft travelling velocities, and relative weights of the weighted aero surface attitude stabilization commands increase with increasing velocities. A rotor blade lift controller receives the weighted rotor blade attitude stabilization commands and the rotor blade speed commands, and positions the rotor blade swashplate to adjust lift and control according to these commands. An aero lift controller receives the weighted aero surface attitude stabilization commands and deploys the aero surfaces to generate lift and control according to the received weighted aero surface attitude stabilization commands.

8 Claims, 11 Drawing Sheets

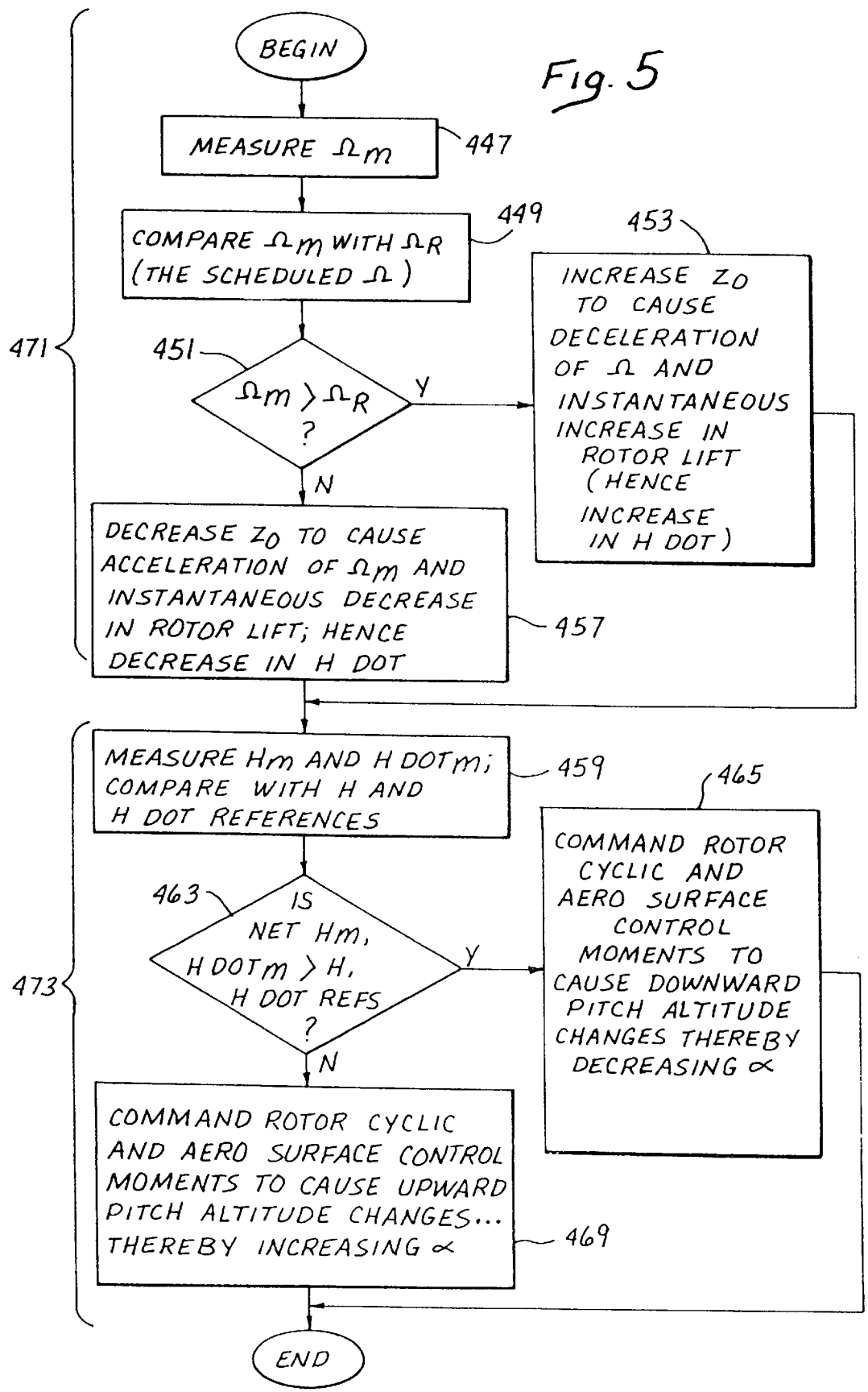

ROTOR AND
AERO LIFT
THRUST (POUNDS)
ROTOR TORQUE
(FT.-POUNDS)

FORWARD ACCELERATION
(KNOTS/SECONDS)

FLIGHT CONTROL SYSTEM FOR JET POWERED TRI-MODE AIRCRAFT

This is a division of application Ser. No. 08/568,144 filed Dec. 6, 1995.

BACKGROUND OF THE INVENTION

This invention relates to an aircraft, and more particularly to a tri-mode jet powered aircraft capable of operating in a transitional mode between a helicopter mode and a fixed-wing mode.

Many prior art devices have combined helicopter and fixed-wing modes of flight. The rotor blade of a helicopter provides aerodynamic features which cannot easily be obtained from conventional aero surfaces, such as wings and tail sections. A rotating rotor blade, for example, provides the advantage of small space takeoffs and landings.

One prior art approach is the Herrick convertiplane, which used a rotating wing in autogyro mode for lift. The main rotor was stopped and started using the energy available from the moving air, as is the case with a traditional autogyro. A fixed wing provided additional lift during the conversion process, but the aircraft could not hover or fly vertically because engine power was not applied to the main rotor.

Another prior art device is disclosed in U.S. Pat. No. 3,327,969. This device, known as the rotor/wing is capable of hover, vertical, and translational flight using a rotor consisting of a large centerbody with three stub blades. Unlike the Herrick convertiplane, the rotor of this device is engine powered to enable hover. The large centerbody of the rotor/wing is sized to provide the necessary lift during conversion to fixed-wing flight while the rotor operates in autogyro mode. The sequence of conversion included fixing the aircraft nose down in helicopter flight while accelerating to conversion speed. Once conversion speed was met, the pilot pitched the aircraft nose up to thereby enter autogyro mode. The pitching of the aircraft nose up provided an angle of attack necessary for the larger centerbody to support the aircraft. At the speed in which all of the lift was carried by the centerbody, the rotor was stopped and locked. The centerbody and stub blades then became a fixed wing. The rotor/wing aircraft suffers from inefficiencies in both the helicopter mode and the fixed-wing mode. In the helicopter mode, a high induced power is required to provide sufficient lift from the stub, and further, the large wing area associated with the large centerbody compromises fixed-wing mode performance.

Other prior art systems combine rotor and fixed-wing modes of flight. None of these prior art devices, however, use a single power source to both drive the rotor blade and to provide jet propulsive force through a jet nozzle. Nor do any prior art devices transition power from the rotating rotor blade to the jet nozzle according to a predetermined schedule to thereby provide highly efficient and stable flight in the transitional mode. That transitional mode involves a process whereby the rotor lift is brought to approximately zero with a control system that allows stable and smooth control of any pre-selected flight path, including constant altitude flight. Prior art systems which attempted to stop a rotor while the rotor was carrying a significant part of the aircraft's total lift tended to develop instabilities in the rotor dynamic forces and in the ability of the aircraft to maintain a desired flight path.

SUMMARY OF THE INVENTION

The present invention solves many of the problems that plague the prior art. Power is applied to the rotor blade and the nozzle in the transitional mode, to thereby enable vertical takeoffs and landings. Unlike many prior art devices, the aircraft of the present invention does not enter any autogyro states, and does not require flight path changes, such as dives, to enter a conversion regime where the rotor is stopped.

Initially, the aircraft of the present invention operates in the helicopter mode, where all power is applied to the rotor blade.

When a predetermined velocity is reached, the aircraft enters the transitional mode. During this transitional mode the aircraft of the present invention maintains stable flight, while slowly phasing-out the helicopter mode and phasing in the fixed-wing mode. Initially most of the available power is applied to the rotor blade, and the rotor blade provides for most of the aircraft's maneuverability and control. Only a small amount of power is applied to the jet nozzle, and the aero surfaces (canard and tail wing surfaces) provide only minimal maneuverability and control since the travelling velocity of the aircraft is low. In later stages of the transitional mode, where the travelling velocity is greater, only a small amount of power is applied to the rotor blade and the rotor blade provides only minimal lift and control. At these later stages, the jet nozzle generates the majority of forward thrust and the aero surfaces provide for most of the aircraft's maneuverability and control.

Once all of the aircraft's weight is supported by the lift generated by the aero surfaces, the rotor blade is locked and the aircraft operates in the fixed-wing mode. This transition from the helicopter mode through the transitional mode and into the fixed-wing mode, as the aircraft speed increases, basically works in reverse, as the aircraft speed decreases. Thus, the tri-mode of operation occurs in both speed directions—during speed increases as fixed-wing mode is approached and during speed decrease following start up of the rotor blade in the fixed-wing mode.

The aircraft of the present invention thus implements a single power source to simultaneously power both the rotor blade and the jet nozzle. Since only one engine is required, a lightweight and reliable aircraft of simple design is provided by the present invention.

The flight control system of the present invention provides for stable flight through the transitional mode by powering both the rotor blade and the jet nozzle, and by slowly deploying the aero surfaces.

Unlike the rotor/wing prior art device, the present invention does not require a large pitch change of the aircraft nose when lift is first placed on the aero surfaces of the aircraft. In contrast to the rotor/wing system of the prior art, the jet powered tri-mode aircraft of the present invention slowly removes lift from the rotor blade and, at the same time, slowly adds lift to the front canard wing and horizontal tail wings. The rotor/wing requires a large upward pitch of its nose, and places a large amount of lift on its aero surfaces in a short period of time.

The flight control system of the present invention includes a rotor blade speed monitor for monitoring the rotor blade speed of the jet powered tri-mode aircraft and for outputting a rotor blade speed command. The flight control system also includes an aircraft attitude controller for controlling the aircraft attitude of the jet powered tri-mode aircraft.

Weighted rotor blade attitude stabilization commands and weighted aero surface attitude stabilization commands are output from the aircraft attitude controller to distribute power, control, and lift between the rotor blade and the aero surfaces. Relative weights of the weighted rotor blade attitude stabilization commands decrease with increasing aircraft travelling velocities, and relative weights of the weighted aero surface attitude stabilization commands increase with increasing velocities.

A rotor blade lift controller receives the weighted rotor blade attitude stabilization commands and the rotor blade speed commands, and positions the rotor blade swashplate to adjust lift and control according to these commands. An aero lift controller receives the weighted aero surface attitude stabilization commands and deploys the aero surfaces to generate lift and control according to the received weighted aero surface attitude stabilization commands.

BRIEF DESCRIPTION OF THE DRAWINGS

FIG. 5 is a flow chart illustrating a flight control method implemented by the flight control system of the presently preferred embodiment;

DESCRIPTION OF THE PREFERRED EMBODIMENT

Figure 1:
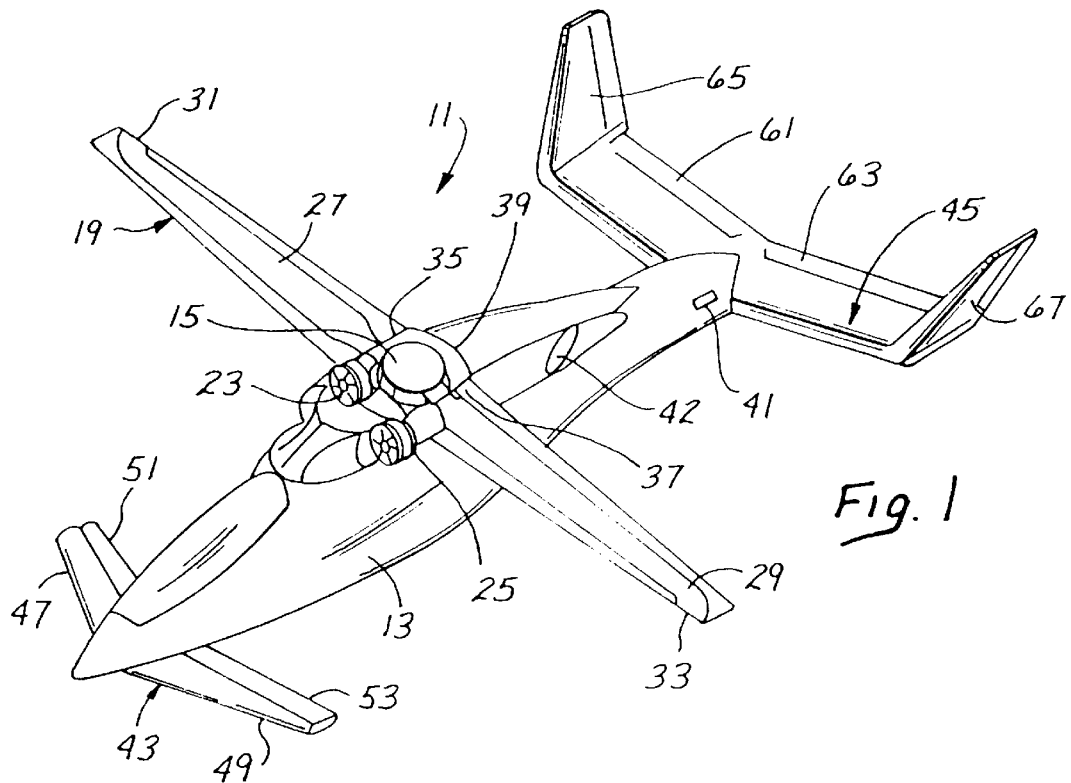
FIG. 1 is a perspective view of the jet powered tri-mode aircraft according to the present invention, with certain external fuselage parts and the rotor blade skins removed to show internal elements.

A macro-perspective of the external structure of the jet powered tri-mode aircraft 11 of the presently preferred embodiment is shown in FIG. 1. The jet powered tri-mode aircraft 11 includes a fuselage 13 having one or a pair of low bypass turbo fan engines 23 and 25 mounted thereon. The rotor blade 19 contains flow ducts 27 and 29. Each of the two flow ducts 27, 29 serve to transport exhaust gases from the engines 23, 25 to exit nozzles 31, 33 located in the tips of the rotor blade 19. Exhaust gases from the two flow ducts 27, 29 spin the rotor blade 19 about the rotor hub 15. The rotor blade 19 preferably comprises symmetrical leading and trailing edges. In the helicopter mode, the front edge of the right side of the rotor blade 19 leads, and the rear edge of the left side of the rotor blade 19 leads. Thus, the symmetrical leading and trailing edges of the rotor blade 19 provides for effective operations irrespective of air flow direction.

The hub 15 preferably comprises a gimbaled/teetering type hub in order to provide flapping degrees of freedom. The two feathering hinges 35 and 37 permit changes in pitch of the left and right halves of rotor blade 19. As the right half of the rotor blade 19 moves through 360 degrees of azimuthal angle, for example, the pitch of that rotor blade 19 is changed to provide optimal lift and control. The aerodynamic hub fairing 39 houses cyclic and collective pitch controllers therein. A left thrustor 41 provides yaw control, as does a right thrustor (not shown) located on the right rear portion of the fuselage 13.

When the jet powered tri-mode aircraft is operated in the helicopter mode, the rotor blade speed can be regulated by a throttle control that modulates fuel flow to vary the torque applied to the rotor blade. This throttle control may be implemented using an electronic control loop that uses fuel control to change engine power in response to rotor blade speed errors.

The jet powered tri-mode aircraft operates in this helicopter mode until a predetermined aircraft travelling velocity V is reached. In the presently preferred embodiment, the jet powered tri-mode aircraft 11 enters the transitional mode of flight at approximately 60 knots. In the transitional mode, a portion of jet exhaust from the bypass turbo fan engines 23, 25 is rerouted to exit from the jet nozzles 42. As the aircraft travelling velocity V increases, more and more of the jet exhaust is routed to the jet nozzles 42, and less and less jet exhaust is routed to the exit nozzles 31, 33.

The high lift flaps 51, 53 of the left and right canard wings 47, 49 are deployed to obtain maximum lift during low-speed flight, as the aircraft travelling velocity increases above 60 knots. The canard wing 43, which is articulated, is rotated to increase its angle of attack. The canard wing thus gains lift with velocity, as does the horizontal tail 45. The horizontal tail 45 is also articulated. It is conventional with respect to other fixed-wing aircraft, and includes two elevons 61, 63 and two generally vertical portions 65, 67.

At an aircraft travelling velocity of approximately 125 to 130 knots, no jet exhaust is routed through the exit nozzles 31, 33, and all of the jet exhaust is routed out of the jet nozzles 42. Additionally, the rotor blade 19 does not generate any lift, and the entire lift of the jet powered tri-mode aircraft is generated by the canard wing 43 and horizontal tail 45.

Figure 2:
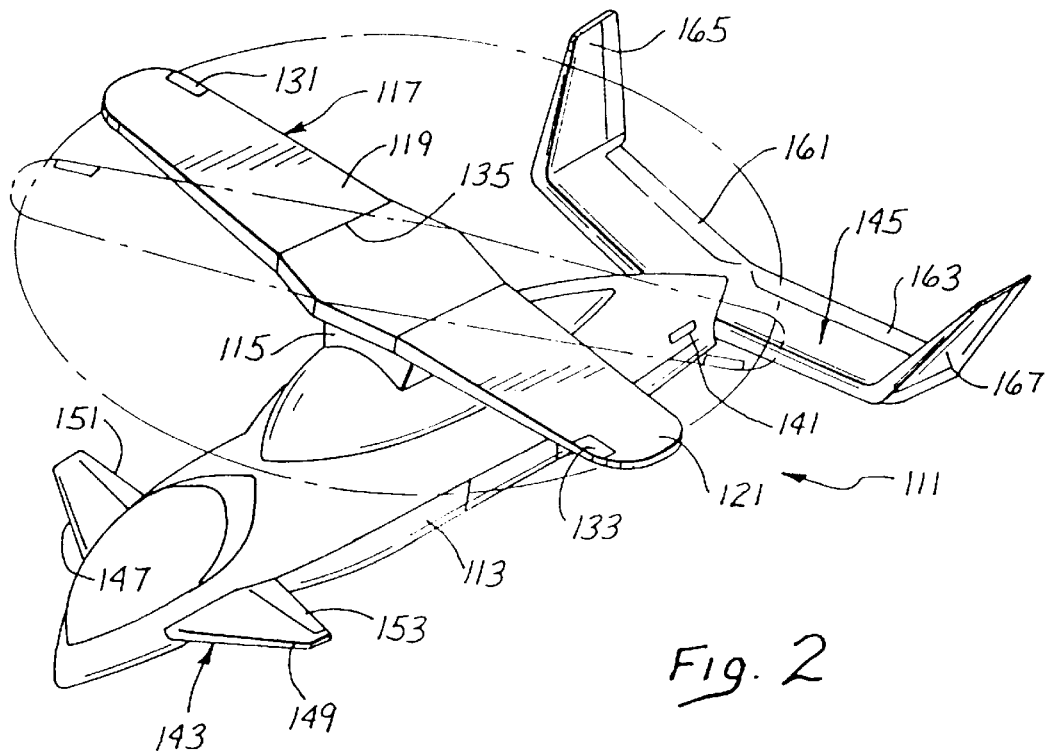
FIG. 2 is a perspective view of a modified embodiment of the jet powered tri-mode aircraft.

FIG. 2 illustrates a high speed version of the jet powered tri-mode aircraft of the present invention. The elements of FIG. 2 are identical with corresponding elements of FIG. 1, and are designated by the same reference numeral preceded by the numeral 1. The canard 143 of the high speed jet powered tri-mode aircraft of FIG. 2 has a smaller span and is more swept than in the corresponding FIG. 1 embodiment.

As the jet powered tri-mode aircraft 111 approaches the conversion speed of 125 knots, the gimbal degree of freedom of the hub 115 is reduced through variable dampers, and the rotor blade 19 is completely unloaded with the ducts 27, 29 being set off. The gimbaling freedom is then locked, the rotor blade 119 stopped and locked to the fuselage 13, and the feathering hinges 35 and 37 locked out such that the rotor blade 17 is fixed to the fuselage 13. At aircraft travelling velocities above 125 knots, the jet powered tri-mode aircraft operates as a fixed-wing aircraft using conventional airplane controls. Cruise lift is shared between the fixed rotor blade 19, the canard 43, and the horizontal tail 45 to minimize induced drag. Further details of the general structure shown in FIGS. 1 and 2 are disclosed in applicant's copending application Ser. No. 08/068,907 filed on May 28, 1993 and titled "Canard Rotor/Wing."

In the transitional mode of flight, power from the low bypass turbo fan engines 23, 25 provides propulsive thrust through the jet nozzles 42, while also powering the rotor blade 19 to generate necessary lift. Unlike conventional helicopters, fuel flow to the low bypass turbo fan engines 23, 25 can no longer be simply regulated to vary the torque applied to the rotor blade 19. As soon as part of the jet exhaust flow from the low bypass turbo fan engines 23, 25 is routed to the jet nozzles 42 for propulsive thrust, throttle control can no longer be used to maintain rotor blade speed without causing severe velocity and flight path disturbances.

Since rotor blade speed in the transitional mode can no longer be maintained by modulating fuel to the low bypass turbo fan engines 23, 25, the present invention uses a unique synergistic system of regulating the rotor blade speed by modulating the collective pitch of the rotor blade 19, combined with a flight path feedback control acting through the aerodynamic surfaces (elevons 61, 63, and the moving horizontal tail 45). Thus, any errors in the rotor blade speed are corrected by changing the collective pitch of the rotor blade 19, combined with corresponding aero surface commands used to hold the reference flight path. In the presently preferred embodiment, collective pitch of the rotor blade 19 is controlled by changing a collective position of the rotor blade swashplate.

Figure 3A:
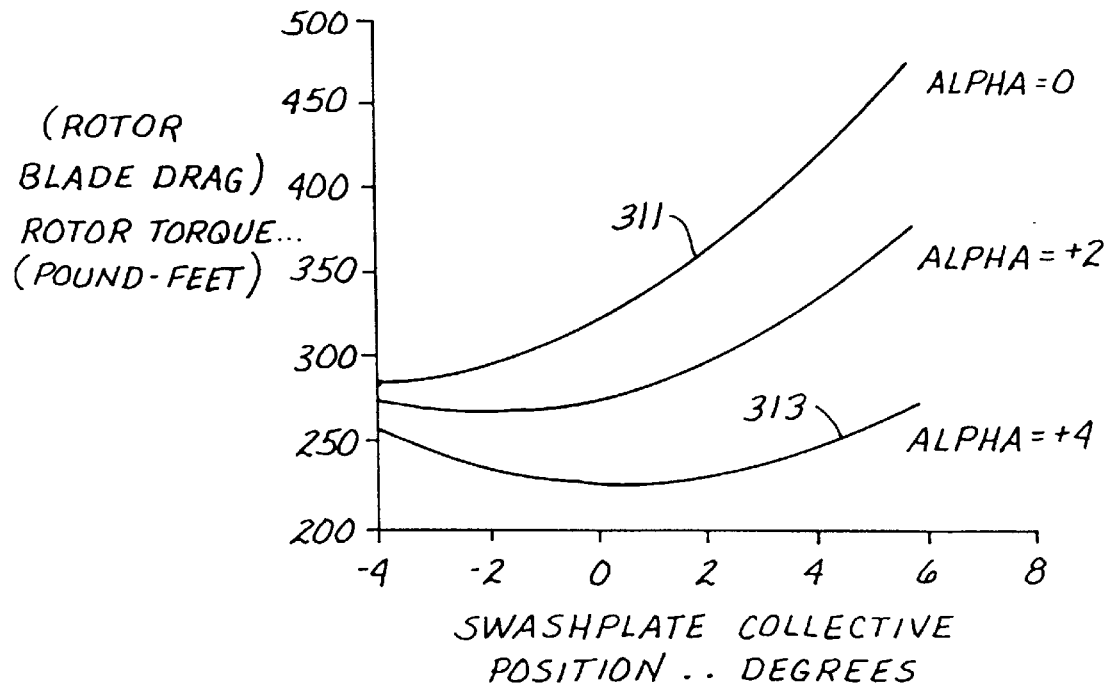
FIG. 3a is a typical plot of rotor blade drag versus swashplate collective position for different tip path plane angles of attack.

A plot of rotor blade drag versus swashplate collective position is shown in FIG. 3a. Rotor blade drag is proportional to rotor torque at all aircraft travelling velocities in the transitional flight regime (V=65 to 130 knots). In the specific case of FIG. 3a, the rotor blade speed is maintained at approximately 70 percent of a full (100 percent) rotor speed, while the forward velocity is 130 knots. The plot of FIG. 3a shows that increasing the swashplate collective position which increases rotor blade collective pitch, corresponds to an increase in the rotor drag—hence rotor torque. Increasing swashplate collective position also increases rotor blade lift. The intent of this figure is to show that a positive slope of the rotor blade drag versus swashplate collective position will allow stable control of rotor speed. An increased slope acts to increase the gain and hence the tightness of the rotor speed control. This figure shows an extreme case where the blade drag versus collective curve is actually negative and hence implies possibility of instability. However, the synergistic combination with the flight path control loop will assure stability even for this case.

Figure 3B:
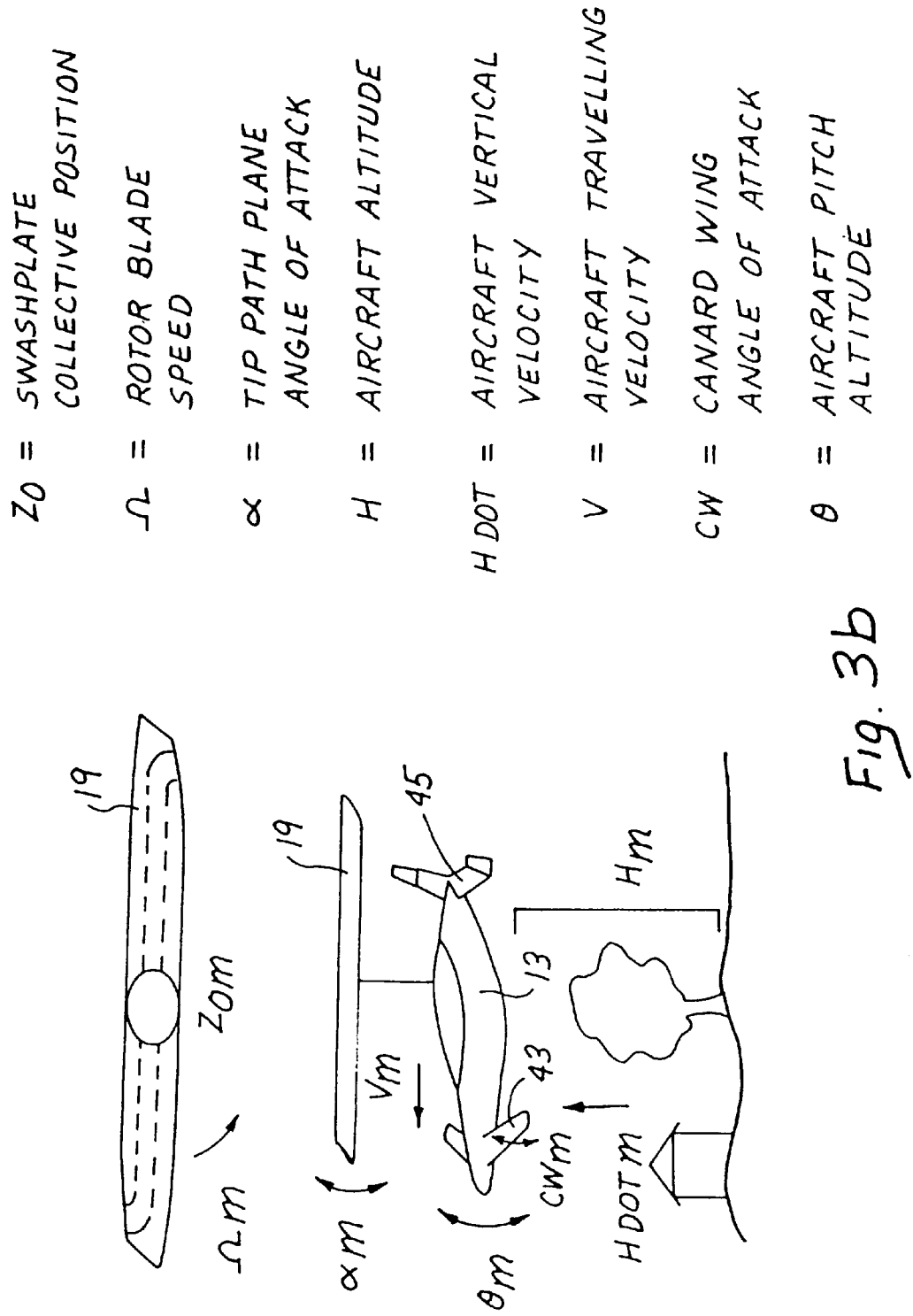
FIG. 3b illustrates and defines terms used in describing the jet powered tri-mode aircraft of the present invention.

The three curves of FIG. 3a illustrate swashplate collective position versus rotor blade drag for three values of $\alpha$. As shown in FIG. 3b, $\alpha$ defines the tip path plane angle of attack of the rotor blade 19. As the front of the tip path plane of the rotor blade 19 is tilted downward, $\alpha$ decreases; and as the front portion of the tip path plane of the rotor blade 19 is tilted up, the tip path plane angle of attack increases.

Looking at the top curve 311 of FIG. 3a, for the swashplate collective position of 2 degrees, a corresponding rotor blade drag of 325 pound feet is generated at $\alpha$ equals 0. If the speed of the rotor blade 19 is too high, the swashplate collective position can be increased to 4 degrees to thereby increase rotor blade collective pitch. At a swashplate collective position of 4 degrees, a rotor blade drag of approximately 425 pound feet is generated which will slow down the rotor blade speed. The present invention implements this relationship between swashplate collective position, rotor blade drag and tip path plane angle of attack to control rotor blade speed when all power from the low bypass turbo fan engines 23, 25 is not directed to the exit nozzles 31, 33.

As shown in FIG. 3b, the swashplate collective position $Z_0$ controls the orientation of the rotor blade 19 as the rotor blade 19 rotates through 360 degrees of azimuthal angle. The variable for rotor blade speed is $\Omega$, and aircraft altitude is denoted by the variable H. Aircraft vertical velocity is denoted by the variable Hdot, and aircraft travelling velocity is denoted by the variable V.

In the transitional mode of flight, much of the actions of the flight control system are programmed to occur at certain aircraft travelling velocities. For example, a predetermined schedule of rotor blade speed is programmed to occur at predetermined aircraft travelling velocities, and a predetermined deployment of the canard wing is programmed to occur at corresponding predetermined velocities. Thus, at any given velocity in the transitional mode, the flight control system of the present invention has scheduled a desired rotor blade speed and a desired canard wing angle of attack (denoted by CW). Generally, measured values of the aircraft flight parameters shown in FIG. 3b are denoted by a subscript "m", and scheduled (or desired) values of the aircraft flight parameters of FIG. 3b are denoted by a subscript "s." The variable $\theta$ indicates an aircraft pitch attitude of the jet powered tri-mode aircraft.

Figure 4:
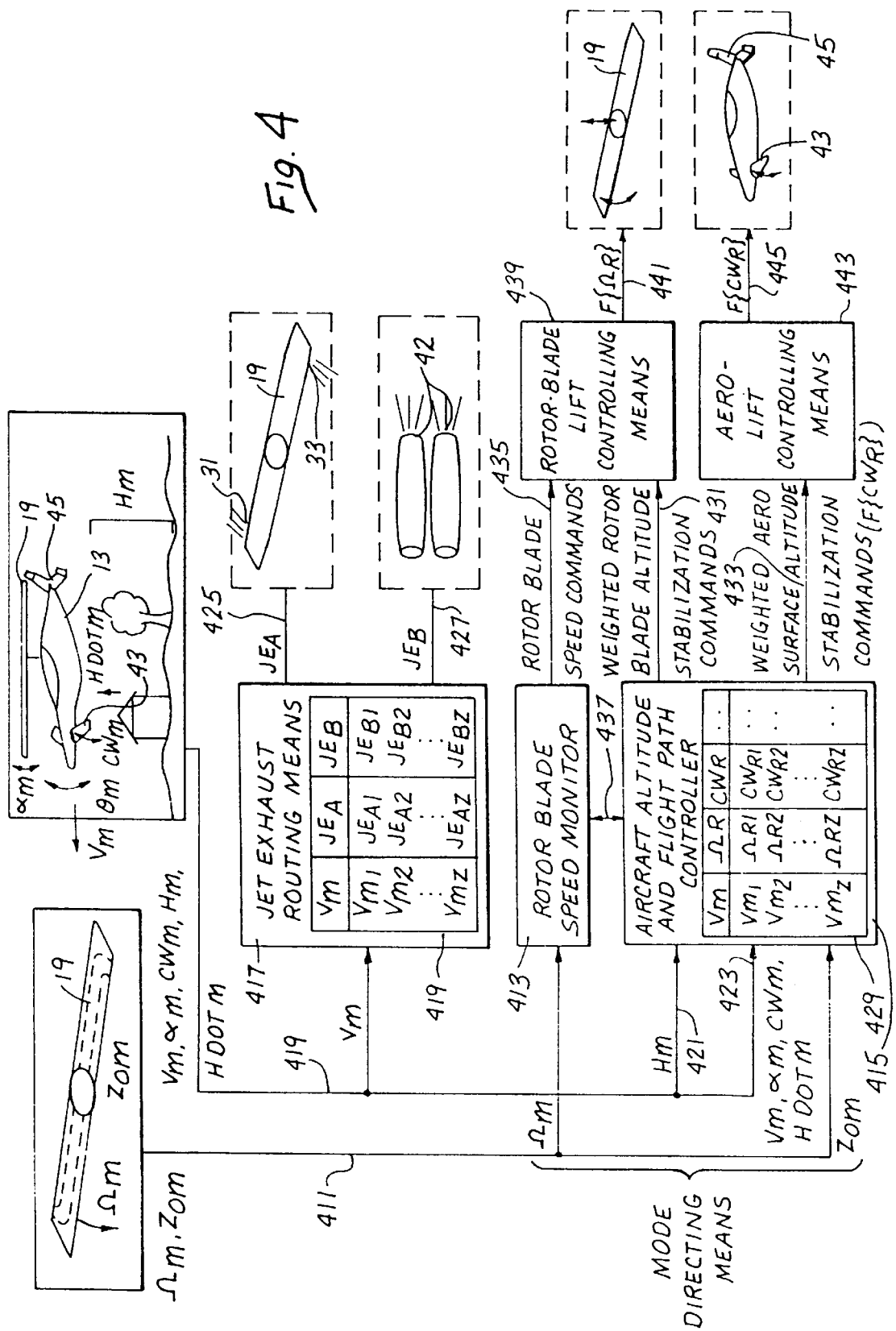
FIG. 4 is a schematic diagram illustrating a general overview of portions of the flight control system of the presently preferred embodiment.

FIG. 4 is a simple diagram illustrating aircraft attitude control, jet exhaust control, and rotor blade speed control of the jet powered tri-mode aircraft 11. The measured rotor blade speed and swashplate collective position are fed down line 411. The rotor blade speed is input into the rotor blade speed monitor 413, and the swashplate collective position is fed to the aircraft attitude controller 415. The rotor blade speed monitor 413 and the aircraft attitude controller 415 generally comprise a mode directing means, which programs rotor blade speed and pitch and roll attitude stabilization gains according to aircraft travelling velocity.

The jet exhaust routing means 417 accepts a measured aircraft travelling velocity from an aircraft flight parameters line 419. The aircraft flight parameters line 419 also feeds a measured aircraft altitude Hm or flight path angle (Hdot/Vm) to the aircraft altitude controller on line 421, and feeds the measured aircraft travelling velocity $V_m$, the measured tip path plane angle of attack $\alpha_m$, the measured canard wing angle of attack $CW_m$, and the measured vertical aircraft velocity $Hdot_m$ to the aircraft attitude and flight path controller 415 via line 423.

The jet exhaust routing means 417 divides jet exhaust from the turbo fan engine or engines 23, 25 between the exit nozzles 31, 33 and the jet nozzles 42, according to the measured aircraft travelling velocity Vm. In the presently preferred embodiment, a lookup table 419 having different jet-exhaust dividing values for each measured aircraft travelling velocity is used. Other means of splitting the jet exhaust according to measured aircraft travelling velocities, however, may be used. A first single $JE_A$ is output on line 425 directing a first allotment of the jet exhaust to the rotor blade exit nozzles 31, 33. A second signal $JE_B$ is output on line 427 directing a second allotment of the jet exhaust to be routed to the jet nozzles 42. In the helicopter mode, the signal $JE_A$ on line 425 directs all power to the exit nozzles 31, 33; and in the fixed-wing mode, the signal $JE_B$ on line 427 directs that all jet exhaust be routed through the jet nozzles 42. In the transition mode (V=60 knots to 130 knots) the exhaust fed to exit nozzles 31 and 33 is reduced from maximum at V=60 knots to zero at V=130 knots.

A similar lookup table 429 is used by the aircraft attitude and flight path controller 415 to control the scheduled rotor blade speed $\Omega_S$ and the schedule canard wing angle of attack $CW_S$, (and other values not shown). The aircraft attitude and flight path controller 415 outputs weighted rotor blade attitude stabilization commands on line 431 and weighted aero surface stabilization commands on line 433. Both the weighted rotor blade stabilization commands on line 431 and the weighted aero surface stabilization commands on line 433 are related to controlling the aircraft pitch and roll attitudes at different aircraft travelling velocities.

All control of the aircraft pitch attitude in the helicopter mode is affected by the weighted rotor blade (or conventional cyclic pitch control of the blade) attitude stabilization commands on line 431, and all control of the aircraft pitch attitude in the fixed-wing mode is affected by the weighted aero surface attitude stabilization commands on line 433. A relative weight of the weighted rotor blade attitude stabilization commands on line 431 decreases with increasing aircraft travelling velocity, and a relative weight of the weighted aero surface attitude stabilization commands on line 433 increases with increasing aircraft travelling velocity.

The rotor blade speed monitor 413 inputs the measured rotor blade speed from line 411, and outputs rotor blade speed commands on line 435. The rotor blade speed monitor 413 communicates with the aircraft attitude controller 415 on the line 437 to receive, among other things, the measured aircraft travelling velocity. The rotor blade speed monitor 413 basically commands different scheduled rotor blade speeds according to the measured aircraft travelling velocity.

The rotor blade speed commands on line 435 and the weighted rotor blade attitude stabilization or cyclic control commands on line 431, directing rotor blade speed and rotor blade attitude stabilization, respectively, are input into the rotor blade lift controlling means 439. The output from the rotor blade lift controlling means 439 on line 441 controls the position of the rotor blade 19 along three longitudinal axes. The sum of these three controls is commonly referred to as the swashplate collective position $Z_0$. Note that the output on line 441 controls the positional orientation of the rotor blade 19, and the output on line 425 from the jet exhaust routing means 417 controls the power applied to the rotor blade 19.

The weighted aero surface attitude stabilization commands on line 433 are input into the aero lift controlling means 443, which outputs elevon positioning commands, plus canard wing positioning commands on line 445. These elevon positioning commands on line 445 work to control the aircraft pitch attitude. The canard wing positioning commands are basically predetermined (scheduled) as a function of velocity. Similarly, the rotor blade positioning commands on line 441 change a scheduled swashplate collective position to achieve predetermined rotor blade speeds which are dependent on the aircraft travelling velocity. The gain or sensitivity of the aircraft pitch attitude controlling commands on lines 441 and 445 change with aircraft travelling velocity so that commands on line 441 to the rotor blade swashplate are maximized at low travelling velocities and commands on line 445 to the elevons are maximized at high travelling velocities. The horizontal tail wings 45 are consequently controlled, details of which will be discussed later.

In addition to the novel deployment features, some of which are outlined in FIG. 4, the present invention further utilizes a synergistic control mechanism between the rotor blade lift controlling means 439 and the aero lift controlling means 443.

An overview of the method of the synergistic coupling is illustrated in FIG. 5, where at Step 447 the rotor blade speed is measured. At Step 449 the measured rotor blade speed is compared with a scheduled rotor blade speed, which is a function of a measured aircraft travelling velocity. This scheduled rotor blade speed may be generated from the lookup table 429 in FIG. 4, for example. If the measured rotor blade speed is greater than the scheduled or reference rotor blade speed, $\Omega_R$ (Step 451), then the rotor blade lift controlling means 439 of the flight control system increases the swashplate collective position, $Z_0$, to thereby command a deceleration of the rotor blade, in accordance with the rotor drag/torque relationships illustrated in FIG. 3a. A by-product of this increase in swashplate collective position is an instantaneous increase in rotor lift which causes an increase in aircraft vertical acceleration and vertical velocity. This acceleration and velocity tend to cause an increase in the aircraft's altitude. This is depicted in Step 453 which is a logic flow summary of a more complex set of flight control laws actually used and described later.

Program flow then passes to Step 459 which represents the action of the aircraft's vertical flight path control loop. For the case under consideration, the vertical velocity and altitude tend to increase above the reference values, in response to the rotor blade speed correction. Hence, in Step 463, the decision path is "Yes" (Y). The result is to cause the flight path control law (Step 465) to command aircraft nose-down control moments. This results in a decrease in angle of attack, $\alpha$, and hence a decrease in total aircraft lift which was causing the aircraft to tend to increase its flight path angle or $Hdot_m$, as well as increase in altitude, $H_m$. Simultaneously, the aircraft's nose down decrease in a causes the rotor drag shown in FIG. 3a to increase, thereby contributing to the desired deceleration of the rotor. Therefore, as the flight path control loop corrects for the undesired deviations of $Hdot2_m$ and $H_m$, it simultaneously corrects for the rotor blade speed error which is already being corrected by the rotor blade speed control function (Step 453). The combination of these two control loops is synergistic: The flight path loop contributes to stable rotor speed control, and the rotor speed control loop contributes to maintaining a stable flight path control.

When this method is considered with an initial condition of $\Omega_m < \Omega R$, then a symmetrical, but reverse process occurs. Step 451 will have a "No" (N) output, and hence a decrease in collective position will be commanded via Step 457. At Step 463, the output will be "No" (N), and hence the flight path control law depicted in Step 469 will be commanded to increase $\alpha$ to thereby result in a decrease of rotor blade drag.

Looking back to Step 451, the initial goal of Step 451 in this example was to lower the measured rotor blade speed to the reference rotor blade speed. At Step 453, this initial goal of lowering the measured rotor blade speed resulted in an increased height, which was corrected at Step 465 by a decrease in aircraft attitude pitch. The decrease in aircraft pitch attitude further decreased the measured rotor blade speed.

A synergistic coupling thus occurs between the rotor blade speed control portion 471 and the flight path aero surface control portion 473 of the method broadly outlined in FIG. 5. The rotor blade speed control portion 471 increases the swashplate collective position to decrease the rotor blade speed a first amount, and to increase the height as a byproduct. The flight path control portion 473 deploys aero surfaces to tip the nose of the jet powered tri-mode aircraft down in order to correct the altitude-increase byproduct, and to subsequently further assist in decreasing the measured rotor blade speed down to the reference rotor blade speed.

In a case where the measured rotor blade speed is less than the reference rotor blade speed ("No" in Step 451), the swashplate collective position is decreased at Step 457 to thereby increase the measured rotor blade speed a first amount. The byproduct from this decrease in swashplate collective position is a decrease in the measured aircraft altitude. When this decrease in measured aircraft altitude is detected by the "No" in Step 463, the aircraft pitch attitude is increased at Step 469 to raise the aircraft altitude and, consequently, to increase the measured rotor blade speed. Step 469 thus increases the rotor blade speed a second amount to thereby assist the goal of Step 457.

Running a third scenario through the control method outlined in FIG. 5, assume that the measured rotor blade speed is equal to the reference rotor blade speed but the measured aircraft altitude is high. The "Yes" of Step 463 determines that the measured aircraft altitude is greater than the reference aircraft altitude, and Step 465 decreases the aircraft pitch attitude to both decrease the measured aircraft altitude and to decrease the measured rotor blade speed. This byproduct decrease in rotor blade speed is detected at Step 455, and the swashplate collective position is decreased to raise the measured rotor blade speed. The byproduct of the decrease in swashplate collective position is a decrease in measured aircraft altitude, which helps to meet the goal of Step 463 by bringing the measured aircraft altitude down to the value of the reference aircraft altitude.

Similarly, a fourth scenario occurs at the "No" branch of Step 463, when the measured rotor blade speed is equal to the reference rotor blade speed but the measured aircraft altitude is low. The measured aircraft altitude is increased at Step 469 by the increase in the aircraft pitch attitude. This increase the aircraft pitch attitude increases the measured rotor blade speed, which is detected at Step 451. The swashplate collective position is increased at Step 453 to lower the measured rotor blade speed and to also increase the measured aircraft altitude. In addition to meeting the goal of decreasing measured rotor blade speed, Step 453 further meets the goal of Step 469 by increasing the measured aircraft altitude.

A proportional plus integral control law is used for changing swashplate collective position in order to change rotor blade speed. As shown in FIG. 3a, most operating regions of rotor blade speed, swashplate collective position, and tip path plane angle of attack following the general relationship where an increase in swashplate collective position will result in a decrease in rotor blade speed. There are regions, however, where the slope of the rotor blade torque (rotor blade drag) versus swashplate collective position is negative. Normally, a stability criterion would be:

$$\frac{\partial Q}{\partial \theta_c} \geq 0,$$

where Q is rotor blade torque, and θ is collective pitch.

The flight control system of the present invention, however, remains stable even when the above derivative is negative. For example, assume an operating state where the tip path plane angle of attack is 4, as shown by the curve 313, and assume that the swashplate collective position is 0. In this case, the rotor torque requirement is around 225 pound feet, indicating that this amount of torque is required to keep the rotor blade 19 spinning at its present rotor blade speed. If the rotor blade speed 19 is too low, then Step 457 of FIG. 5 commands a decrease in the swashplate collective position. When the swashplate collective position is decreased on this curve 313, however, the torque requirement actually increases instead of decreasing. The flight control system of the present invention compensates for this and remains stable, by moving the equilibrium to an increased a where the drag/torque is lower, as desired.

Figure 6A:
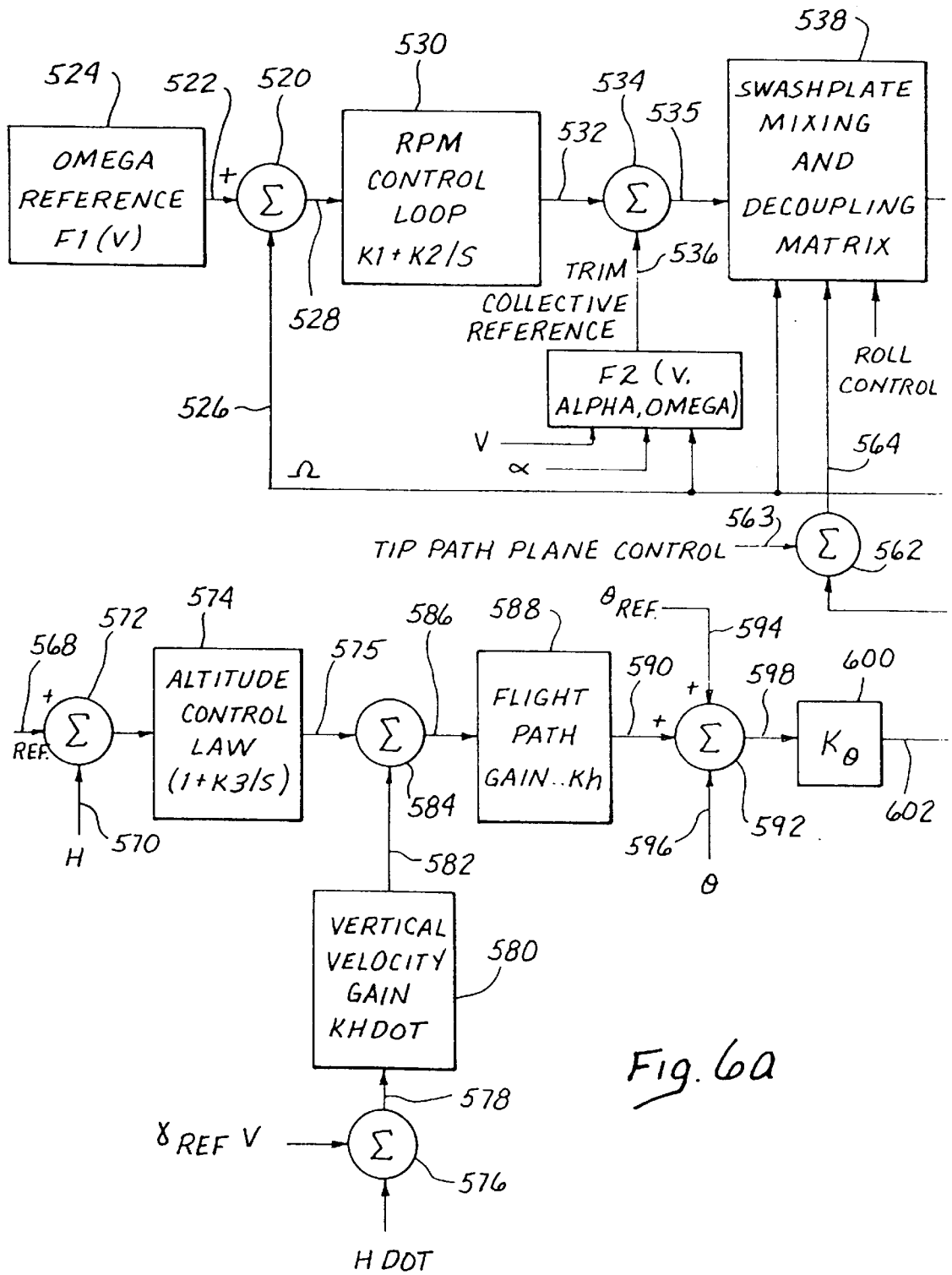
FIG. 6 is a simplified block diagram of the flight control system according to the presently preferred embodiment.
Figure 6B:
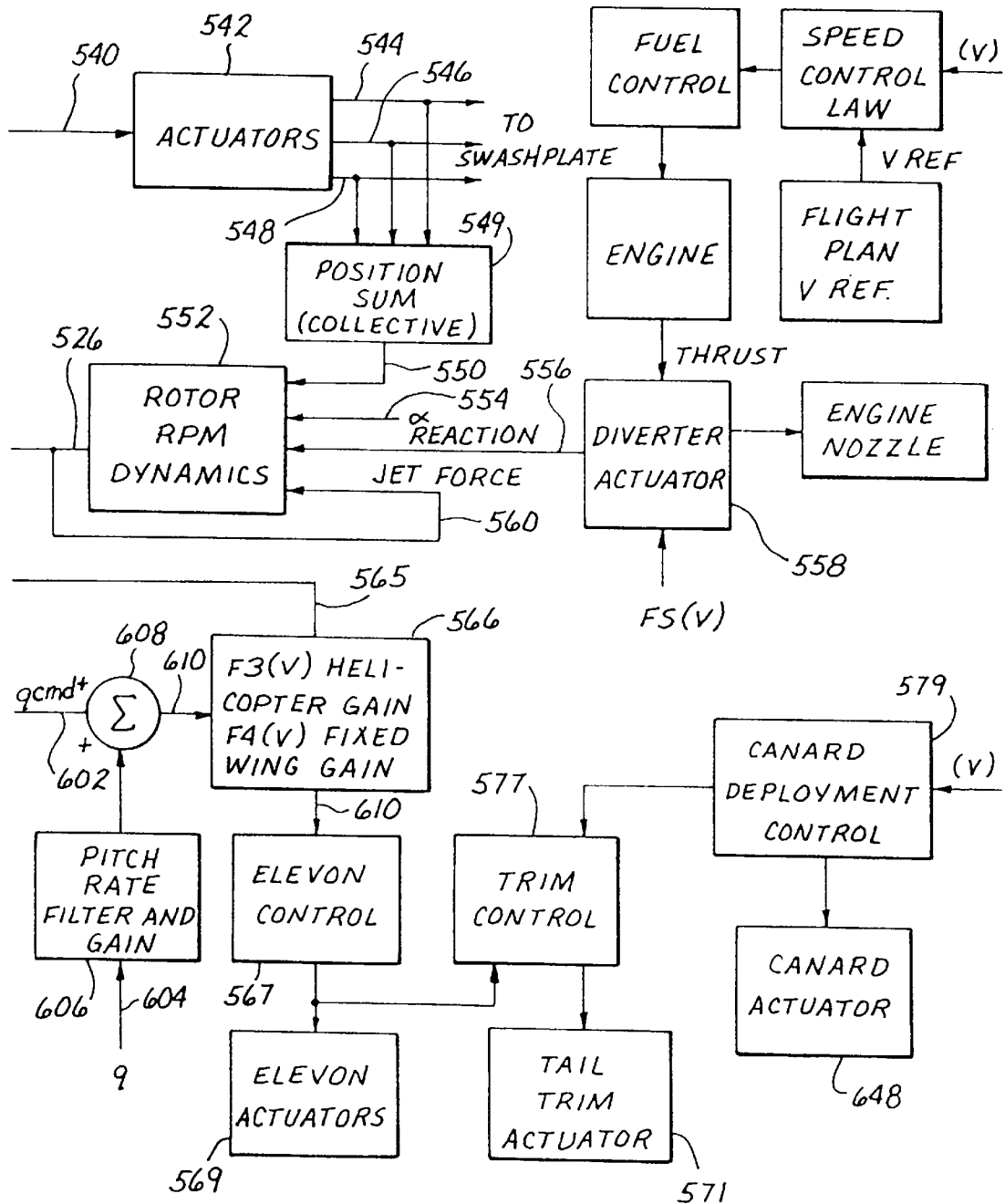

A more detailed discussion of the flight-control system of the present invention is now provided with reference to FIG. 6. The block diagram illustrated in FIG. 6 roughly corresponds to the block diagram of FIG. 4. Generally, a scheduled rotor blade speed 522 is compared to a measured rotor blade speed 526 to generate a rotor-blade speed command similar to that shown at 435 in FIG. 4. The lower-left hand corner of FIG. 6 compares a scheduled aircraft altitude H with a measured aircraft altitude H at the summing junction 572, compares a scheduled aircraft vertical velocity Hdot with a measured aircraft vertical velocity Hdot at the summing junction 576, and compares a scheduled aircraft pitch attitude plus a commanded pitch attitude which is proportional to the flight path error (586) with a measured aircraft pitch attitude to produce an aircraft-pitch-attitude error signal 598. The split-mode gain block 566 roughly corresponds to the aircraft attitude controller 415 of FIG. 4, since the split-mode gain block 566 generates weighted rotor-blade attitude stabilization commands 565 and weighted aero-surface attitude stabilization commands 610. Both the measured rotor blade speed 526 and the weighted rotor-blade attitude stabilization commands 565 are fed to the swashplate mixing and decoupling matrix 538, which is similar to the rotor-blade lift controlling means 439 of FIG. 4.

Looking at FIG. 6 in greater detail, the summing junction 520 receives the scheduled rotor blade speed (omega reference) 522 from the omega reference block 524. The reference rotor blade speed 522 is the desired or scheduled rotor blade speed, and may be measured in radians per second, for example. The scheduled rotor blade speed 522 is expressed as F1(V), which means that it is a function of the measured aircraft travelling velocity V.

As discussed above with reference to FIG. 4, a predetermined schedule 429 of aircraft travelling velocity versus rotor blade speed determines a scheduled rotor blade speed 522 for each measured aircraft travelling velocity. Thus, the predetermined schedule 429 assigns a percentage of the maximum rotor blade speed to each measured aircraft travelling velocity of the jet-powered tri-mode aircraft 11. At a current measured aircraft travelling velocity V the omega reference block 524 determines and outputs an omega reference signal F1(V) 524, which expresses a scheduled rotor blade speed for that current measured aircraft travelling velocity V. The omega reference signal F1(V) 24, for example, will always command a desired 100% rotor blade speed at jet-powered tri-mode aircraft 11 measured aircraft travelling velocities below 60 knots. For measured aircraft travelling velocity V values of 60 knots and greater, the omega reference signal F1(V) 24 commands scheduled rotor blade speeds, which decrease with increasing measured aircraft travelling velocity V. At a measured aircraft travelling velocity V of approximately 120 knots, the omega reference signal F1(V) 24 commands the scheduled rotor blade speed to be near 70 percent, while the rotor lift achieved at that omega approaches zero.

The other input into the summing junction 520 is the measured value of the rotor blade speed 526. The summing junction 520 subtracts the measured rotor blade speed 526 from the reference rotor blade speed 522 to thereby generate an output 528, which represents the error between the scheduled rotor blade speed 522 and the rotor blade speed 526 that was actually measured.

The error signal 528 is input into the RPM control loop 530, which outputs an error in rotor blade collective pitch 532. This outputted error 532 in rotor blade collective pitch indicates an error in the collective pitch of the rotor blade 19, relative to a value of rotor blade collective pitch that is predicted to give the desired rotor blade speed and lift at the given aircraft velocity.

The error in rotor blade collective pitch 532 is inputted into the summing junction 534. Also inputted into the summing junction 534 is the trim collective reference 536. The trim collective reference 536 is a computed value that predicts what the actual value of the rotor blade collective pitch should be, based on the measured aircraft travelling velocity V, the measured tip path plane angle of attack ($\alpha$) of the rotor blade, and the measured value of rotor blade speed 526. Thus, the summing junction 534 adds the error in rotor blade collective pitch 532 to the predicted value of rotor blade collective pitch, and outputs the sum 535 to the swashplate mixing and decoupling matrix 538.

The swashplate mixing and decoupling matrix 538 accepts the output 535 from the summing junction 534, and generates an output 540 that commands an effective rotor blade collective pitch. The output 540 is input to the actuators block 542. The actuators block 542 outputs three signals 544, 546, 548 to the three actuators A, B, and C (not shown), respectively. These three signals 544, 546, 548 are also input into the position sum block 549. The position sum block 549 sums the three signals 544, 546, 548 to generate the position sum 550 of the swashplate, which is the swashplate collective position $Z_0$.

The rotor RPM dynamics block 552 depicts a differential equation whose solution describes the measured value of rotor blade speed 526, which is measured and input into the summing junction 520, as previously described. The measured value of rotor blade speed 526 is a function of the swashplate collective position $Z_0$, the tip path plane angle of attack of the rotor blade ($\alpha$) 554, the reaction jet force 556 outputted from the diverter actuator 558, and the measured value of rotor blade speed 526. The reaction jet force 556 is the portion of the jet engine exhaust diverted up through the rotor blade 19 and out of the right and left exit nozzles 31, 33 (FIG. 1). The measured value of rotor blade speed 526 is fed back via line 560 and input into the rotor RPM dynamics block 552, since rotor blade speed is a function of rotor blade drag and rotor blade drag is dependent on rotor blade speed (the faster the rotor blade speed the more drag).

The summing junction 562 inputs a tip path plane control signal 563, which is a predicted or desired cyclic pitch, and also inputs a cyclic pitch control command 565, which is derived from the attitude stabilization error, part of which is channeled via signal 565 to the rotor cyclic controls. The output of the summing junction 562 comprises an error signal 564, which is inputted into the swashplate mixing and decoupling matrix block 538. The error signal 564 provides information as to the longitudinal cyclic control that is desired from helicopter-mode, and is derived from attitude and flight path stabilization loops shown in the lower portion of FIG. 4.

The split-mode gain block 566 outputs helicopter gain F3(V) to the summing junction 562, and outputs fixed-wing gain F4(V) to the elevon control 567. Both of these gains are a function of the current measured aircraft travelling velocity V, and effectively command pitch angular accelerations of the jet-powered tri-mode aircraft 11. The helicopter gain portion of the split-mode block 566 commands an amount of cyclic pitch F3(V) needed for stabilization in the helicopter mode, and this desired amount of cyclic pitch is summed with the tip path plane control 563, which is the predicted cyclic pitch that would have been desired based upon the flight conditions. The fixed-wing gain portion of the split-mode block 566 outputs F4(V) fixed-wing stabilization gain commands to the elevon control 567. Pitch angular acceleration commands are fed from the elevon control 567 to the elevon actuators 560 and to the trim control 571.

In the pure helicopter mode, the computed cyclic control gain F3(V) of 566 is at its maximum and the computed fixed-wing gain F4(V) is zero. As V increases, the gain F3(V) decreases and the gain F4(V) increases until a maximum gain value is reached at velocities near conversion speed (about 120 knots).

Looking now at the lower left portion of FIG. 4, the aircraft altitude reference 568 (which is the desired aircraft altitude) and a measured aircraft altitude 570 are input into the summing junction 572. The output 574 is the error between the aircraft altitude reference 568 and the measured aircraft altitude. This aircraft altitude error output 574 is input into the aircraft altitude control law block 574, which outputs vertical velocity commands 575 to correct any aircraft altitude errors.

The summing junction 576 inputs on its left side the product of the flight path angle (gamma reference) and the current aircraft travelling velocity V, and inputs on its bottom side Hdot. The product of gamma reference and V is equal to Hdot. Hdot is the current vertical velocity of the jet-powered tri-mode aircraft 11. The variable gamma reference is the desired flight path angle. As an example relating gamma (flight path angle) to alpha (tip path plane angle of attack), the jet-powered tri-mode aircraft 11 may have a flight path angle equal to zero but may have a positive tip path plane angle of attack. Gamma reference would be set to zero, for example, for constant aircraft altitude flight. Using this example, Hdot should be zero as well. Any Hdot that is not zero is passed from the summing junction 576 as an error signal 578 to the vertical velocity gain block 578. The vertical velocity gain block 580 implements a control law, which produces an output 582 in response to the error signal 578.

The summing junction 584 inputs any H error (vertical position error) from its left and inputs any Hdot error (vertical velocity error) from its bottom, and generates an error signal 586. The flight path gain block 88 implements a control law on the output 586. This control law uses a function of the vertical position error plus the vertical velocity error, multiplied by a flight path gain, Kh, to produce an aircraft pitch attitude error command 590. Note that this aircraft pitch attitude error command 90 relates to the pitch of the jet-powered tri-mode aircraft 11, not to the collective pitch of the rotor blade 19.

The summing junction 592 inputs theta reference 594 (which is the predicted or desired value of aircraft pitch attitude), theta 596 (which is the measured aircraft pitch attitude of the jet-powered tri-mode aircraft 11), and the aircraft pitch attitude error command 590.

The aircraft pitch attitude error command 590 introduces a correction to the reference aircraft pitch attitude 594, to thereby effectively change the value of the reference aircraft pitch attitude 594. If the measured aircraft pitch attitude 596 is the same as the sum of both the aircraft pitch attitude reference 594 and the aircraft pitch attitude command 590, then the output 598 is zero. The output of the summing junction 592 is thus a pitch error signal 598, which measures a difference between the reference aircraft pitch attitude 594, adjusted by the aircraft pitch attitude error command 590, and the measured aircraft pitch attitude 596.

The pitch error signal 598 is input into the multiplying block 600, which inputs the pitch error signal 598 and outputs a pitch rate command qcmd 602 to correct the pitch error signal 598. Since the measured pitch rate q 604 is a "noisy" measurement, it is passed through the pitch rate filter and gain 606. Units of the pitch rate command qcmd 602 are radians per second commanded; the pitch rate q is subtracted from pitch rate command qcmd 602 by the summing junction 608, to yield an error signal 610 expressed in radians per second of error. The error signal 610 is then fed to the split-mode gain block 66, which as discussed above is fed to the rotor and fixed-wing controls.

The flight path and rotor blade control loops shown in FIG. 6 address the problem of precisely managing the rotor blade speed during the transitional mode of flight, despite unavailability of engine power for that task. Also, the interaction of the rotor attitude control via the swashplate and the aerodynamic surface controls which include elevons, rudders, movable horizontal tail and movable canard are managed to achieve steady state trim during the transitional mode of flight. Moreover, rotor flapping is reduced to zero when the fixed-wing mode of flight is entered.

The rotor blade speed control loop used to control the rotor blade 19 in the pure helicopter mode is based on the engine and fuel control, even though the present invention implements a jet-exhaust driven rotor blade. This part of the flight control system is not shown in FIG. 6.

Regarding the rotor blade speed and aero lift deployment table 429, which was briefly mentioned with reference to FIG. 4, a further discussion follows. During the transitional mode, the reference rotor blade speed is programmed downward from 100% as aero lift (canard wing 43 and horizontal tail 45) begins to assume a major part of the total lift. The reference rotor blade speed is programmed downward using the rotor blade speed schedule which is a function of air velocity, and which is linked to a schedule for lifting surface deployment so that a rotor operating point defining rotor blade speed, tip path plane angle of attack, and rotor blade collective pitch yields a predicted rotor lift that adds with the predicted aero lift to equal aircraft lift.

Prediction of lift inherent in the rotor speed schedule and the associated surface deployment schedules need not be accurate, since the presently preferred embodiment corrects any errors using closed loop flight control processes. Because of the stability and synergism of the rotor blade speed controls and the flight path controls, reduction in rotor speed can occur without disturbing the flight path. Moreover, reducing the rotor blade speed is consistent with obtaining a good rotor blade operating condition for the reduced rotor blade lift requirement, which states that rotor blade lift must be decreased to zero before the fixed-wing mode of flight can be entered. This reduced rotor blade lift, along with reduced rotor blade flapping requirements, are converged to zero as the aero surfaces assume control of the jet powered tri-mode aircraft 11 trimming moments.

A predicted trim collective reference is compared with a measured trim collective pitch to produce an error signal. The rotor blade collective pitch is predicted beforehand so that for each aircraft travelling velocity a desired (reference) value of rotor blade collective pitch exists to obtain the desired (reference) rotor blade lift. (The aircraft travelling velocity tables split up the lift.) If the predicted (reference) rotor blade collective pitch is not correct, (for example, if the aero characteristics were not perfectly predicted), then the closed loop always generates the correct aero lift and correct rotor blade collective pitch to maintain the flight path of the aircraft.

The scheduling of the canard wing angle of attack with measured aircraft travelling velocity requires a prediction of a horizontal tail 45 angle needed to maintain pitch trim. This horizontal tail angle is largely a function of the canard wing angle of attack. Both the horizontal tail 45 and canard wing 43 servo actuators operate at fixed trim rates via screw jack types of gearings in the presently preferred embodiment. This gearing minimizes weight of the jet powered tri-mode aircraft 11, and this type of servo is usually driven by an on-off control law, with hysteresis, for electronic simplicity and low power consumption. Use of a linear, high performance servo may also be implemented accordingly to preference for driving the canard wing 43 and horizontal tail 45.

The aero surface deployment functions illustrated in the lower right of FIG. 6 are further described with reference to FIG. 7. Aircraft pitch attitude stabilization is achieved by the closed loop controls based on a pitch attitude plus pitch rate system similar to that described for the helicopter mode in U.S. Pat. No. 5,001,646 but, simultaneously, the pitch stabilization loop is also closed through the aerodynamic surface controls using the elevons. As speed increases, the gains of the aero surface controls are increased, both inherently by the increasing dynamic pressure, and explicitly by the increase of gain from zero in hover to a maximum at the transition speed velocities. At higher aircraft travelling velocities, aero gains are again reduced to compensate for increased control surface effectiveness. As aero control gains increase, rotor blade control gains are reduced so rotor blade control gains are near zero at an aircraft travelling velocity of approximately 125 knots.

Figure 7:
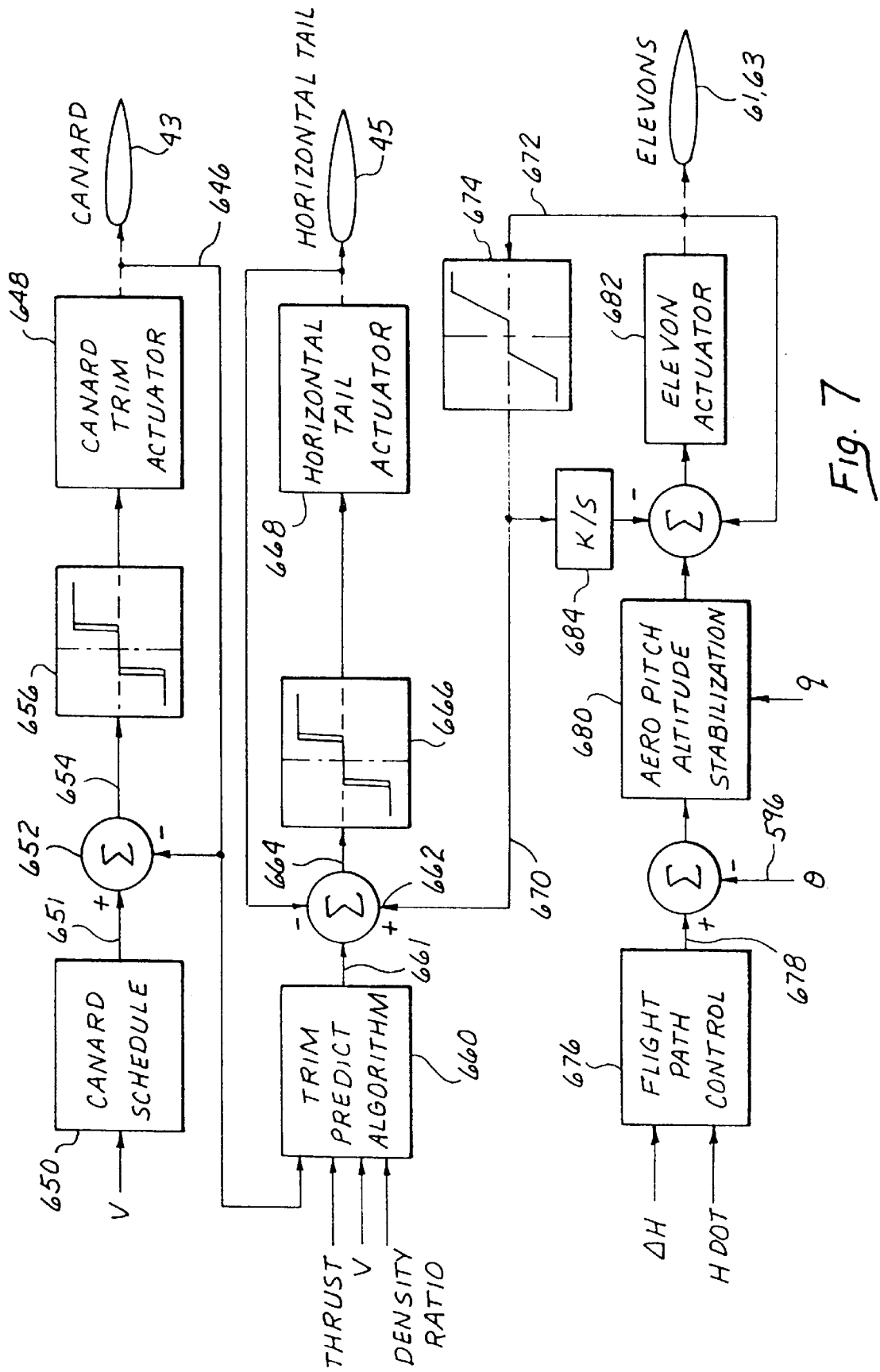
FIG. 7 is a block diagram illustrating the aero surface control loops of the block diagram of FIG. 6 in greater detail.

Looking at FIG. 7, the canard schedule block 650 implements a predetermined schedule in order to deploy the canard wing 43 more and more, thereby increasing canard wing lift, as aircraft travelling velocity of the jet powered tri-mode aircraft 11 increases. For example, when the aircraft travelling velocity is about 60 knots the predetermined schedule may require the canard wing 43 to be deployed at about six degrees, and when the aircraft travelling velocity reaches about 120 knots the predetermined schedule may require the canard wing 43 to be fully deployed at about 18 degrees. This predetermined schedule may comprise a table similar to that shown at 429 in FIG. 4, for example, including a percentage or angle of canard wing deployment for each aircraft travelling velocity of the jet-powered tri-mode aircraft 11. While the canard schedule block 650 outputs a desired canard deployment angle 651, the canard trim actuator 648 outputs the measured (or actual) position of the canard wing 43.

Assume, for example, that the canard wing is scheduled by the canard schedule block 650 to be deployed 6 degrees at 60 knots. Now, if the measured canard wing position 646 output from the canard trim actuator 648 is five degrees, then this signal 646 is input into the summing junction 652 and compared with the scheduled value 651 of six degrees. An error signal 654 of one degree is output from the summing junction 652 and into the control loop 656. The control loop 656 for positioning the canard wing is depicted in FIG. 7 as an on/off controller for simplicity. In the presently preferred embodiment, the on/off controller has a threshold of a tenth of a degree, so that errors less than a tenth of a degree are not corrected. In the example, the one degree error signal 654 commands the canard wing 43 to move at a fixed rotation rate in the positive direction until a measured value of six degrees is attained. The new measured value 646 of six degrees will be fed back to the summing junction 652, and an error signal 654 of zero will be output to the control loop 656. The canard wing 43 is thus driven by the canard trim actuator 648 until the error signal 654 from the summing junction 652 is reduced to zero.

The canard wing 43 is thus deployed more and more, to thereby pick up more and more lift, as the aircraft travelling velocity of the jet-powered tri-mode aircraft 11 increases. Unless the horizontal tail 45 of the jet-powered tri-mode aircraft 11 picks up corresponding amounts of lift, an unbalanced pitching moment will develop to cause a pitch angular acceleration tending to increase the aircraft pitch attitude of the jet-powered tri-mode aircraft 11. In addition to altering the flight path, this increased pitch could result is stalling the jet-powered tri-mode aircraft 11. Lift of the horizontal tail 45 of the jet-powered tri-mode aircraft 11 must therefore be increased with increases in lift of the canard wing 43 to achieve steady state trim.

The measured canard wing position 646 is fed to the trim predict algorithm block 660 in order to increase the lift of the horizontal tail for maintaining trim. The thrust of the jet-powered tri-mode aircraft 11 which incorporates a measure of the drag, the measured aircraft travelling velocity of the jet-powered tri-mode aircraft 11, and the density ratio which is used in computing the lift of the tail, are also input into the trim predict algorithm block 660. The trim predict algorithm block 660, uses known characteristics of the horizontal tail 45 and the four above-mentioned inputs to predict how much horizontal tail lift is needed to maintain trim of the jet-powered tri-mode aircraft 11. The output 661 of the trim predict algorithm block 660 is similar to the scheduled canard wing deployment value 651 output from the canard schedule block 650, since the output 661 expresses a desired or scheduled horizontal tail 45 deployment. The output 661 of the trim predict algorithm block 660 is input into the summing junction 662.

The horizontal tail actuator 664 outputs a measured horizontal tail value 666, which is fed back and input into the summing junction 662. Similarly to the summing junction 652, the summing junction 662 takes the difference between the desired horizontal tail deployment 661 and the measured horizontal tail deployment, and outputs an error signal 664. This error signal is then input into the control loop 666, which forces the horizontal tail actuator 668 to move the horizontal tail until the error signal 664 is zero.

Many elements in the aircraft pitch attitude stabilization loop shown in FIG. 7 are similar to corresponding elements in the bottom of FIG. 6. The flight path control block 676 corresponds to the aircraft altitude control law block 574 of FIG. 6, the flight path gain block 588 of FIG. 6, and the vertical velocity gain block of FIG. 6. The output from the flight path control block 676 is a pitch command, which is a combination of the aircraft pitch attitude command 590 of FIG. 6 and the pitch reference command 594 of FIG. 6. The measured pitch 596 is labeled the same in both figures. The aero pitch attitude stabilization block 680 corresponds to the multiplying block 600 of FIG. 6, the pitch rate filter and gain 606 of FIG. 6, and the F4(V) fixed-wing gain portion of split-mode block 566 of FIG. 6. The elevon actuator 682 of FIG. 6 corresponds to the elevon actuators 569 of FIG. 6, and the trim control block 577 of FIG. 6.

The aircraft pitch attitude stabilization loop shown in the bottom FIG. 7 positions the elevons on the horizontal tail 45. Thus, any unbalanced pitching moments between the canard wing 43 and the predicted horizontal tail deployment are corrected by pitching moments of the elevons 61, 63. Increasing the lift of the elevons 61, 63, for example, tends to decrease the tip path plane angle of attack.

The aircraft pitch attitude stabilization loop thus maintains a scheduled aircraft flight path by moving the elevons 61, 63. The elevons 61, 63, however, should not maintain a correcting pitch moment over any significant period of time. Elevons have a limited control moment authority compared to the larger horizontal tail. It is desirable that steady state trim moments be provided by horizontal tail deployment, thereby preventing saturation of the elevons. Any steady positioning of the elevons 61, 63, which creates a long term pitch moment on the jet-powered tri-mode aircraft 11, and which can be maintained by the horizontal tail 45 just as well, is transferred to the horizontal-tail summing junction 662. For example, if the aircraft pitch attitude of the jet-powered tri-mode aircraft 11 needs to be decreased, then the elevons 61, 63 can be moved to provide an amount of lift in the rear of the jet-powered tri-mode aircraft 11 to thereby decrease the aircraft pitch attitude of the jet-powered tri-mode aircraft.

Most if not all of the lift generated by the elevons 61, 63, results from steady state error. This steady state error can be corrected by the horizontal tail 45, thus freeing the elevons 61, 63 to correct future errors. The elevons 61, 63 are thus unloaded, and the horizontal tail 45 is deployed an amount to provided the needed lift that was originally provided by the elevons 61, 63. In other words, any steady state displacement held by the elevons 61, 63 to trim the jet-powered tri-mode aircraft 11 is transferred to the horizontal tail 45.

The steady state error 672 to be transferred from the elevons 61, 63 to the horizontal tail 45 is input through a small dead-zone device/controller 674, and then fed into the horizontal-tail summing junction 662. Thus, the horizontal tail 45 is corrected with both an error signal 664 correcting the horizontal-tail deployment to a scheduled value and also a steady state error signal 670 that was being corrected by the elevons 61, 63. The multiplying block and integrator 684 subtracts steady state displacement picked up by the horizontal tail 45 from the elevons 61, 63 so that the net control moment change resulting from the movement of the tail 45, and the reduction in elevon position is maintained at zero.

Turning briefly back to FIG. 6, the elevon control block 567 controls the elevon actuators 569 to correct pitch errors in the jet-powered tri-mode aircraft 11. Steady state errors are transferred to the tail trim actuator 571 via the feedback path from the elevon control 567 to the trim control 577. Meanwhile, the canard deployment control 579 deploys the canard wings according to the input measured aircraft travelling velocity, and this measured aircraft travelling velocity is also input into the trim control 577 to generate the scheduled horizontal tail deployment signal 661 of FIG. 6.

The elevon control law has an added integral control so that steady state attitude trim errors are maintained at the aero controls and not at the rotor controls. This is done to reduce rotor flapping to as close to zero as possible as conversion speed is approached. Steady error held by the elevons is transferred to the horizontal tail through the mechanism shown in FIG. 7. This technique, if surface effectiveness parameters are predicted perfectly, will result in zero pitch transient. If the surface effectiveness parameters are not perfectly known, the closed loop attitude stabilization control law will force the elevon to hold the correct instantaneous pitching moment required to maintain precise attitude control. The control law that transfers the elevon trim position to the tail is illustrated in FIG. 6, but represented algorithmically by:
If long term or filtered $$|\delta|_E > \epsilon$$

then:
$\delta_{HT}$ Required=

$$\frac{M_{\delta_E}}{M_{\delta_{HT}}} * \delta_E$$

=signal 670 on FIG. 7.
where
$\delta_{HT}$=Horizontal Tail Deflection
$\delta_E$=Elevon Deflection
$M_{\delta_{HT}}$ and $M_{\delta_E}$ are dimensional pitching moment coefficients for the surfaces
$\epsilon$=Trim transfer threshold . . . dead zone on 674 of FIG. 7

As canard deployment as a function of velocity and associated tail deployment proceeds, the aero lift grows, and (via the closed loop flight path control) causes a proper balance in rotor lift. That closed loop control is aided by a scheduled set of rotor parameters. These rotor parameters include RPM, scheduled as a function of aircraft velocity by F1(V) in FIG. 6, and a predicted rotor blade collective pitch F2(V,$\alpha$,$\Omega$), also shown in FIG. 6. With increasing speed, rotor lift converges toward zero so that any residual cyclic control needed to produce the appropriate feathering that will balance rotor movements as a function of rotor azimuthal position, also converges toward zero. In addition, elevon controls pick up a major part of the rotor asymmetric moments since cyclic control gains are being reduced with aircraft travelling velocity.

FIGS. 8 through 17 illustrate data obtained from computer generated simulations of a 1600 pound jet 35 powered tri-mode aircraft 11 from 60 knots to approximately 120 knots, at which speed the remaining rotor blade lift was approximately 100 pounds. Conversion speed was in the vicinity of 125 knots for the conditions shown in the simulation. Rotor blade speed control and flight path control are shown to be effective, with considerable stability margin. The rotor blade speed was scheduled downward from 100 percent at 60 knots to 70 percent at 100 knots, and the canard wing position was scheduled as a function of velocity so that full deployment of 18 degrees occurred at 120 knots.

From hover to about 60 knots, conventional helicopter swashplate controls provided the equivalent of longitudinal and lateral cyclic and collective, although in the fly-by-wire mechanization of the present invention cyclic and collective controls are not explicitly identified. Rather, with the fly-by-wire system a swashplate tilt and position (corresponding to the desired pitch and roll angular acceleration) and the desired normal acceleration is commanded by the pilot. Since the baseline design operates with a variable rotor RPM, the reference swashplate axis for the required tilt angles change with that RPM. Those tilt angles are defined by a transformation matrix that relates the desired accelerations to positions of the main rotor actuators. Another departure from more conventional helicopter flight controls is a result of eliminating the anti-torque requirement. Some yaw control is needed for pointing the aircraft's x axis, especially in a crosswind. This yaw control is accomplished by porting engine bypass flow out of both sides of the aircraft symmetrically, prior to reaching 60 knots. An on-off controller commands a brief closing of one or the other side exit ports to produce the desired yawing moment. After 60 knots, bypass flow is used for propulsive thrust and yaw control is taken over by the rudders.

Simulations were initialized at V=60 knots, with 6 degrees of canard already deployed. The canard included 40 degrees of flap. A deliberate lift unbalance of 600 pounds was inserted at the start of the simulation to test the stability of all controls. The existence of this large initial condition "upset" in the lift equation was useful because it provided a very good test of system responsiveness, stability, and robustness.

Figure 8:
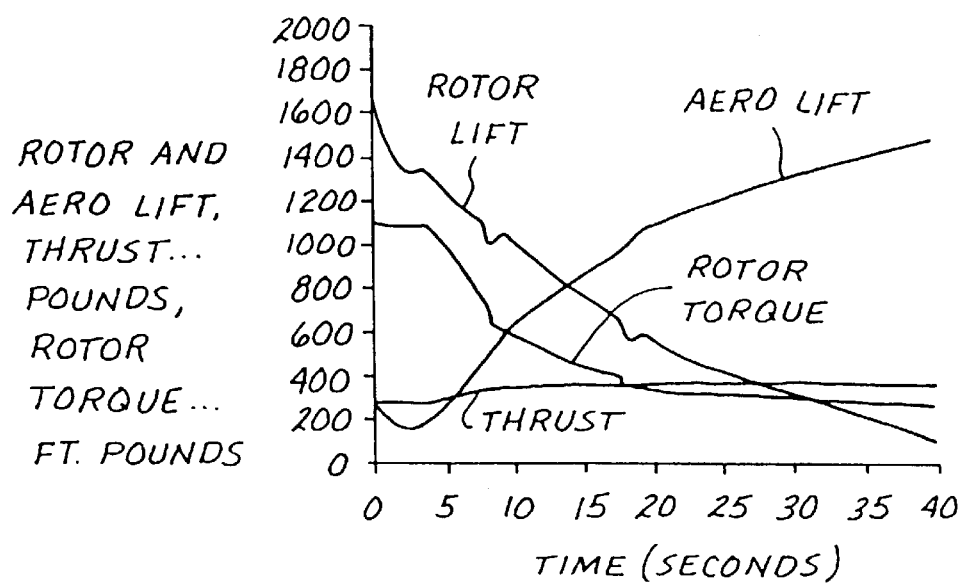
FIG. 8 is a plot of flight parameters of the jet powered tri-mode aircraft versus time.

FIG. 8 is a time history of the various lift components, rotor torque, and propulsive thrust after some initial adjustments were made to improve flight path stability. Those adjustments involved the altitude loops pitch command authority. When those authority limits were set for about 2 to 4 degrees, the aero control law was not very effective in limiting the magnitude of the initial altitude "ballooning" resulting from an initial total lift of 2200 pounds acting on the 1600 pound aircraft. When the pitch authority was increased to about ±10 degrees, the initial altitude excursion was constrained to about 25 feet (compared to about 80 feet for the lower command limits).

Figure 9:
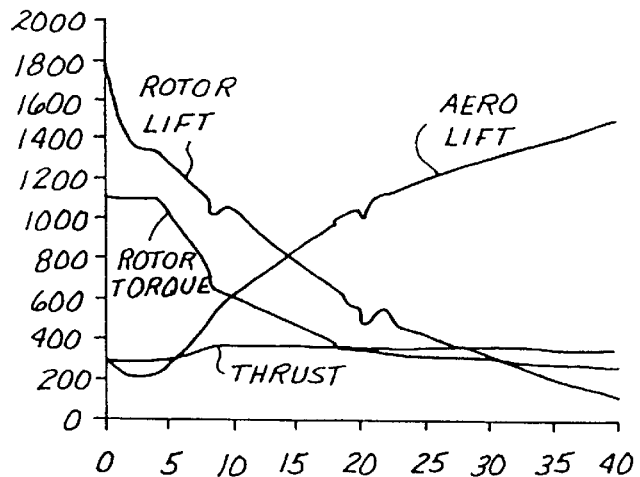
FIG. 9 is another plot of flight parameters of the jet powered tri-mode aircraft versus time, with transients inserted.

FIG. 9 shows the same responses when a 1.0 degree $\alpha$ (tip path plane angle of attack) step was inserted at t=18 seconds and removed at t=20 seconds. The transients in the rotor lift responses are caused by the trim error at t=0, and by discontinuities in the rotor blade speed schedule which is a function of aircraft travelling velocity. That rotor speed schedule requires a continuous rotor angular acceleration which has discrete changes at 70, 80, and 100 knots, which correspond to time marks at t=4, 8, and 17.5 seconds. Step changes in the rotor angular acceleration requirement results in a requirement for a step change in the collective position which in turn causes a transient in the rotor lift and torque. The rotor speed schedule can be smoothed to eliminate or minimize this effect. However, it is apparent from the responses that these transients are readily accommodated by the control system.

Figure 10:
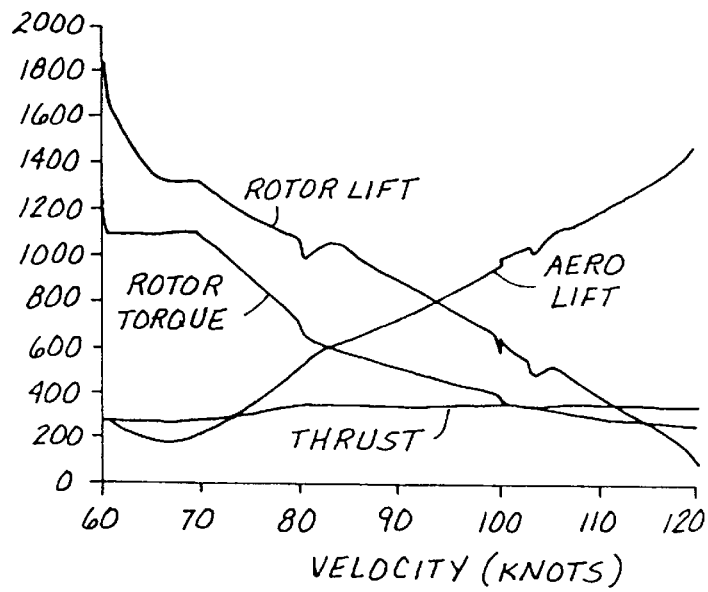
FIG. 10 is a plot of flight parameters of the jet powered tri-mode aircraft versus velocity, with transients inserted.
Figure 11:
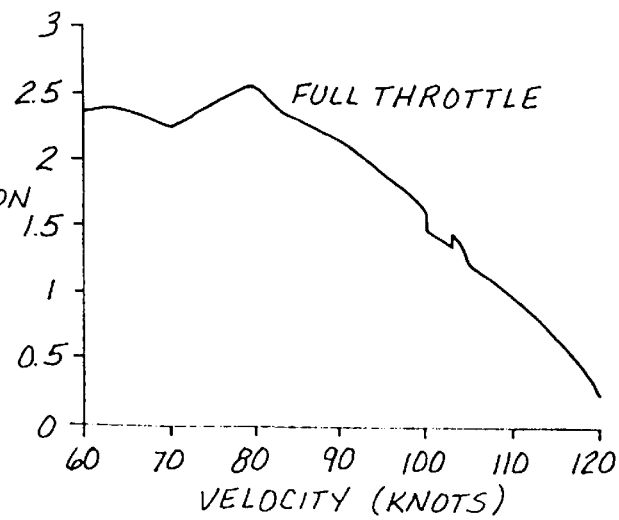
FIG. 11 is a plot of forward acceleration of the jet powered tri-mode aircraft versus velocity.

FIG. 10 presents the same information of FIG. 9 with aircraft velocity as the abscissa. It shows the traces condensed at the higher speeds, indicating that the acceleration decreases as conversion speed is approached. A separate plot of the actual forward acceleration derived from the "thrust-drag" equation is illustrated in FIG. 11. This acceleration was provided by a marginal engine for this vehicle and by limitations in the efficiency of the diverter valve (driven by diverter actuator 558). It is apparent that enhancements in those areas can provide for much greater accelerating capability.

Figure 12:
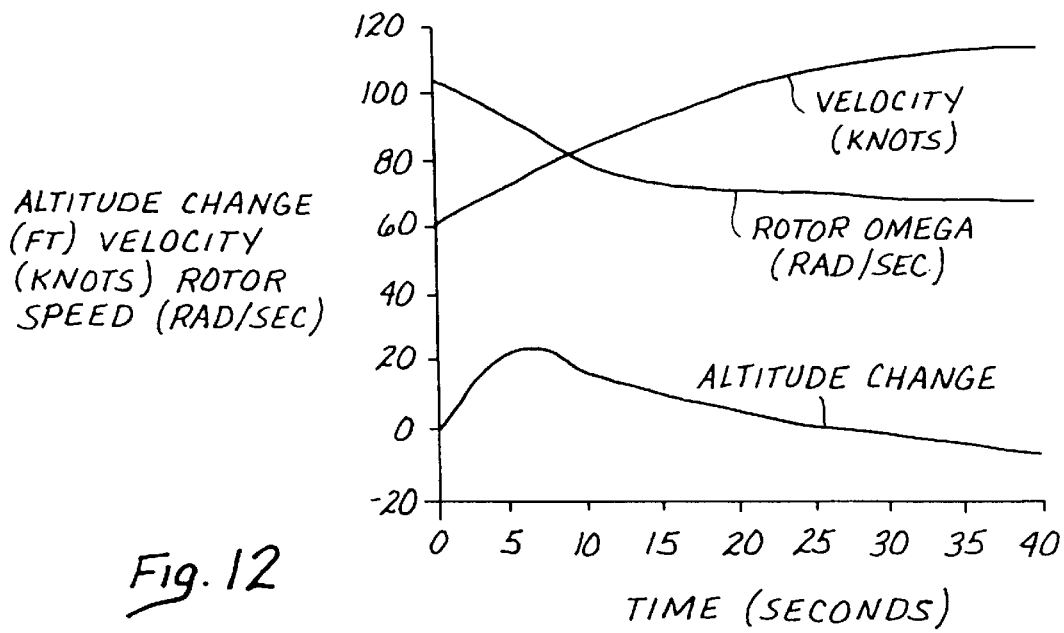
FIG. 12 is a plot of flight parameters of the jet powered tri-mode aircraft versus time, with α transients inserted at 18 and 20 seconds.

An additional view of other key variables versus time is given in FIG. 12. Here velocity, altitude and the rotor speed are shown in radians/second, noting that 100% rotor speed, $\Omega$, is 103.5 radians/second. Altitude "ballooning" due to the 600 pound initial error in total lift reaches about 25 feet, and then returns to zero in accordance with the dynamics of the altitude hold control law. That control law would tend to show a time constant of 5 seconds in the transient recovery, because of the high altitude rate damping term. The nominal altitude control, expressed in degrees of pitch command per vertical error is:

Pitch Command=$0.2(\Delta H+5H+0.05\int \Delta Hdt)$ where the integral term includes appropriate switching logic and saturation/wind-up constraints. FIG. 12 also shows that the rotor blade speed, $\Omega$, holds the reference values accurately, despite the initial transient disturbance in the lift equation, and despite the flight path changes which cause coupling of angle of attack dependent torques into the rotor torque equation. Also shown in this figure is the slow-down in the velocity rate of change as speed has increased. Because of the initial altitude transient of about 5 feet per second in the first 4 seconds, angle of attack experiences a large negative excursion, even without the closed loop pitch down corrections. That negative $\alpha$ will cause rotor torque to increase, thereby resulting in a drop in collective as the rotor speed is maintained at the reference value. Lowering collective drops rotor lift, as does the decreasing $\alpha$. Hence, the rotor speed control acts synergistically with the aero flight path control loop, as discussed previously. In the case of this initial transient, the response must cause both rotor lift and aero lift to drop, as demonstrated in FIGS. 8, 9 and 10.

Figure 13:
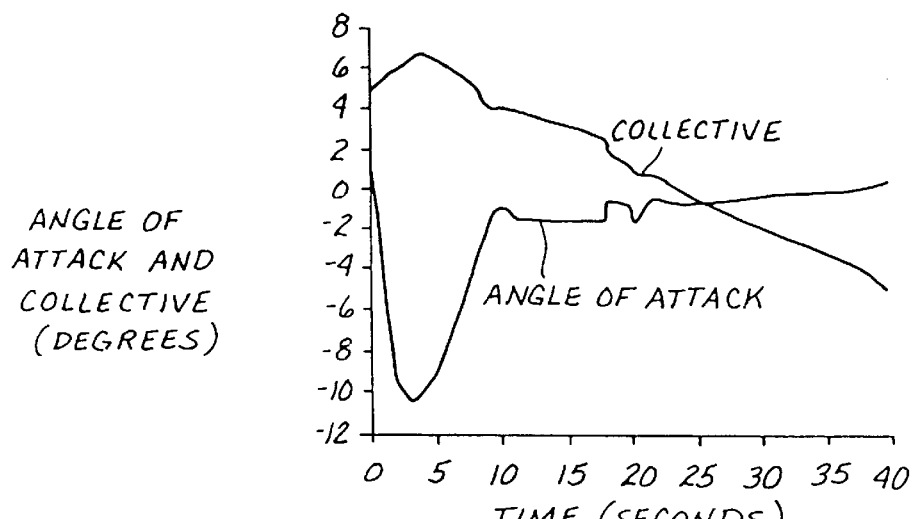
FIG. 13 is a plot of tip path plane angle of attack and swashplate collective position versus time.

A more detailed view of how a and collective act during the control process is shown in FIG. 13. It is seen that the equilibrium $\alpha$ initially is about −1 degree.

Figure 14:
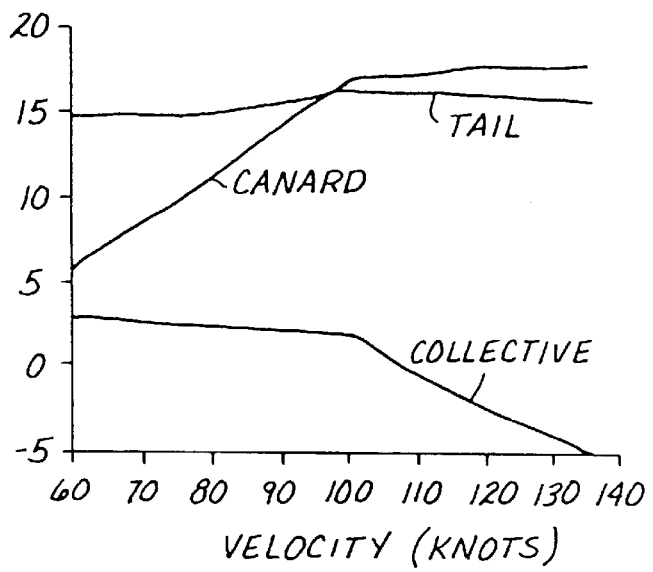
FIG. 14 is a plot of aero surfaces and swashplate collective position versus velocity.

An area of concern is the stall margins associated with the surface deployment. A schedule for canard deployment as a function of velocity in order to assure reasonable stall margins is illustrated in FIG. 14. Also shown in this figure is the horizontal tail needed to trim the aircraft for this particular canard schedule and for a nominal angle of attack and nominal thrust. As demonstrated by the initial lift unbalance transient in the simulations, neither the nominal angle of attack nor nominal thrust actually occurred. However, use of a nominal schedule value for the tail position allows improvements in the performance of the closed loop servo system driving this surface. Likewise, a nominal collective schedule, needed to give the desired rotor lift at the scheduled rotor speed, was defined for use as a "feedforward compensation" in the collective servo loop. This is also shown on FIG. 14, and may be compared with FIG. 13, where the actual collective positions in response to the closed loop on rotor speed are shown. (The closed loop collective does not deviate much from the predicted values, except during the large initialization transient.)

Figure 15:
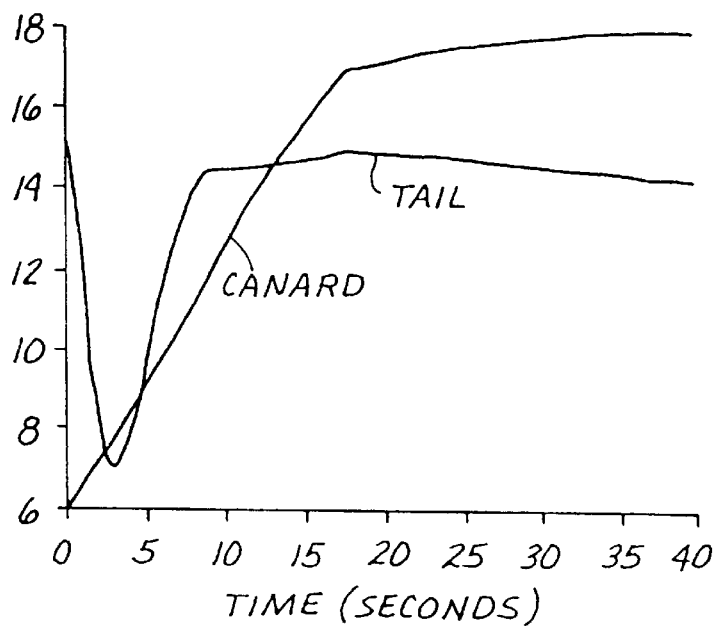
FIG. 15 is a plot of aero surfaces versus time.

FIG. 15 illustrates the actual canard and tail positions obtained in the simulations. Since there is no closed loop acting on the canard, its actual position is identical to the programmed position. The highest rate of canard deployment occurring is 0.67 degrees per second, which is below the desired maximum rate of 1.0 degree per second. However, the horizontal tail motion associated with the initialization transient reached about 3 degrees per second. A transient lift disturbance of this magnitude is not considered to be a realistic condition of flight, although it was retained in this demonstration in order to test the system's ability to cope with, and properly reject external disturbances.

Some qualitative issues are suggested by FIG. 15. They relate to stall margin. It is desirable that the tail have a greater stall margin than the canard. The canard deployment schedule was chosen so that the maximum surface incidence at about zero angle of attack was about 75% to 80% $C_L$ Max.

The flight path and "altitude hold" controller has implications for stall margin discussions. While an "active control" type of stall prevention loop could be used, a simple command limiting constraint was implemented in performing these simulations. That command limiter was placed on the pitch corrective command issued by the altitude hold control law. A limit of ±10 degrees was applied to assure that stall could never be reached when surfaces are fully deployed. It is observed in FIG. 12 that the peak altitude error was about 25 feet.

I claim:

1. A method of stabilizing a jet-powered tri-mode aircraft as the jet-powered tri-mode aircraft travels in a transitional mode, which is between a helicopter mode and a fixed-wing mode, the method comprising the following steps:

measuring a rotor blade speed of the jet-powered tri-mode aircraft;

comparing the measured rotor blade speed to a scheduled rotor blade speed;

detecting a difference between the scheduled rotor blade speed and the measured rotor blade speed;

changing a swashplate collective position of the jet-powered tri-mode aircraft in response to the detected difference between the scheduled rotor blade speed and the measured rotor blade speed, the change in the swashplate collective position both bringing the measured rotor blade speed a first amount closer to the scheduled rotor blade speed and changing a flight path of the jet-powered tri-mode aircraft;

measuring the flight path of the jet-powered tri-mode aircraft;

comparing the measured flight path to a scheduled flight path;

detecting a difference between the scheduled flight path and the measured flight path; and changing an aircraft pitch attitude of the jet-powered tri-mode aircraft in response to the detected difference between the scheduled flight path and the measured flight path, the change in the aircraft pitch attitude both bringing the measured flight path closer to the scheduled flight path and also bringing the measured rotor blade speed a second amount closer to the scheduled rotor blade speed, wherein the detected difference between the scheduled rotor blade speed and the measured rotor blade speed is partially corrected by the first amount when the swashplate collective position is changed, and partially corrected by the second amount by the change in the aircraft pitch attitude.

2. The method of stabilizing a jet-powered tri-mode aircraft according to claim 1, wherein the flight path of the jet-powered tri-mode aircraft is defined by an aircraft altitude of the jet-powered tri-mode aircraft.

3. The method of stabilizing a jet-powered tri-mode aircraft according to claim 2, wherein the measured rotor blade speed is greater than the scheduled rotor blade speed, wherein the step of changing the swashplate collective position of the jet-powered tri-mode aircraft includes a substep of increasing the swashplate collective position of the jet-powered tri-mode aircraft, the increase in the swashplate collective position of the jet-powered tri-mode aircraft decreasing the measured rotor blade speed the first amount and increasing an aircraft altitude of the jet-powered tri-mode aircraft, wherein a measured altitude of the measured flight path is greater than a scheduled altitude of the scheduled flight path, and wherein the step of changing a aircraft pitch attitude of the jet-powered tri-mode aircraft includes a substep of decreasing the aircraft pitch attitude of the jet-powered tri-mode aircraft, the decrease in aircraft pitch attitude of the jet-powered tri-mode aircraft decreasing the altitude of the jet-powered tri-mode aircraft and also decreasing the measured rotor blade speed the second amount.

4. The method of stabilizing a jet-powered tri-mode aircraft according to claim 2, wherein the measured rotor blade speed is less than the scheduled rotor blade speed, wherein the step of changing the swashplate collective position of the jet-powered tri-mode aircraft includes a substep of decreasing the swashplate collective position of the jet-powered tri-mode aircraft, the decrease in the swashplate collective position of the jet-powered tri-mode aircraft increasing the measured rotor blade speed the first amount and decreasing an aircraft altitude of the jet-powered tri-mode aircraft, wherein a measured altitude of the measured flight path is less than a scheduled altitude of the scheduled flight path, and wherein the step of changing a aircraft pitch attitude of the jet-powered tri-mode aircraft includes a substep of increasing the aircraft pitch attitude of the jet-powered tri-mode aircraft, the increase in aircraft pitch attitude of the jet-powered tri-mode aircraft increasing the altitude of the jet-powered tri-mode aircraft and also increasing the measured rotor blade speed the second amount.

5. A method of stabilizing a jet-powered tri-mode aircraft as the jet-powered tri-mode aircraft travels in a transitional mode, which is between a helicopter mode and a fixed-wing mode, the method comprising the following steps:

measuring a flight path of the jet-powered tri-mode aircraft;

comparing the measured flight path to a scheduled flight path;

detecting a difference between the scheduled flight path and the measured flight path; and changing an aircraft pitch attitude of the jet-powered tri-mode aircraft in response to the detected difference between the scheduled flight path and the measured flight path, the change in the aircraft pitch attitude of the jet-powered tri-mode aircraft both bringing the measured flight path closer to the scheduled flight path and also changing a rotor blade speed of the jet-powered tri-mode aircraft;

measuring the rotor blade speed of the jet-powered tri-mode aircraft;

comparing the measured rotor blade speed to a scheduled rotor blade speed;

detecting a difference between the scheduled rotor blade speed and the measured rotor blade speed;

changing a swashplate collective position of the jet-powered tri-mode aircraft in response to the detected difference between the scheduled rotor blade speed and the measured rotor blade speed, the change in the swashplate collective position both bringing the measured rotor blade speed closer to the scheduled rotor blade speed and bringing the measured flight path of the jet-powered tri-mode aircraft closer to the scheduled flight path, wherein the detected difference between the scheduled flight path and the measured flight path is partially corrected by the change in aircraft pitch attitude of the jet-powered tri-mode aircraft, and partially corrected by the change in the swashplate collective position of the jet-powered tri-mode aircraft.

6. The method of stabilizing a jet-powered tri-mode aircraft according to claim 5, wherein the flight path of the jet-powered tri-mode aircraft is defined by an aircraft altitude of the jet-powered tri-mode aircraft.

7. The method of stabilizing a jet-powered tri-mode aircraft according to claim 6, wherein the measured altitude is less than the scheduled altitude, wherein the step of changing the aircraft pitch attitude of the jet-powered tri-mode aircraft includes a substep of increasing the aircraft pitch attitude of the jet-powered tri-mode aircraft, the increase in the aircraft pitch attitude of the jet-powered tri-mode aircraft increasing an aircraft altitude of the jet-powered tri-mode aircraft and increasing the measured rotor blade speed, wherein the measured rotor blade speed is greater than the scheduled rotor blade speed, and wherein the step of changing a swashplate collective position of the jet-powered tri-mode aircraft includes a substep of increasing the swashplate collective position of the jet-powered tri-mode aircraft, the increase in swashplate collective position of the jet-powered tri-mode aircraft decreasing the measured rotor blade speed and also increasing the altitude of the jet-powered tri-mode aircraft.

8. The method of stabilizing a jet-powered tri-mode aircraft according to claim 6, wherein the measured altitude is greater than the scheduled altitude, wherein the step of changing the aircraft pitch attitude of the jet-powered tri-mode aircraft includes a substep of decreasing the aircraft pitch attitude of the jet-powered tri-mode aircraft, the decrease in the aircraft pitch attitude of the jet-powered tri-mode aircraft decreasing an aircraft altitude of the jet-powered tri-mode aircraft and decreasing the measured rotor blade speed, wherein the measured rotor blade speed is less than the scheduled rotor blade speed, and wherein the step of changing the swashplate collective position of the jet-powered tri-mode aircraft includes a substep of decreasing the swashplate collective position of the jet-powered tri-mode aircraft, the decrease in swashplate collective position of the jet-powered tri-mode aircraft increasing the measured rotor blade speed and also decreasing the altitude of the jet-powered tri-mode aircraft.

* * * * *